(12) United States Patent
Schnell et al.

(10) Patent No.: US 6,672,731 B2
(45) Date of Patent: Jan. 6, 2004

(54) VEHICULAR REARVIEW MIRROR WITH BLIND SPOT VIEWING SYSTEM

(75) Inventors: Robert E. Schnell, West Olive, MI (US); David K. Willmore, Holland, MI (US); Richard J. Weber, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 46 days.

(21) Appl. No.: 09/991,463

(22) Filed: Nov. 16, 2001

(65) Prior Publication Data

US 2002/0159171 A1 Oct. 31, 2002

Related U.S. Application Data

(60) Provisional application No. 60/252,149, filed on Nov. 20, 2000.

(51) Int. Cl.[7] ............................................. G02B 7/182
(52) U.S. Cl. ..................... 359/877; 359/873; 359/874; 359/875
(58) Field of Search ................................ 359/877, 873, 359/874, 875, 872, 850, 855, 865, 843, 841, 849

(56) References Cited

U.S. PATENT DOCUMENTS

| | | | |
|---|---|---|---|
| 4,105,301 A | 8/1978 | Doeg | 350/289 |
| 4,712,879 A | 12/1987 | Lynam et al. | 350/357 |
| 4,792,220 A | 12/1988 | Janowicz | 350/637 |
| 4,834,522 A | 5/1989 | Janowicz | 350/637 |
| 4,907,870 A * | 3/1990 | Brucker | 359/875 |
| 4,940,322 A | 7/1990 | Hamamoto et al. | 350/637 |
| 4,971,430 A | 11/1990 | Lynas | 350/605 |
| 5,033,835 A | 7/1991 | Platzer, Jr. | 350/637 |
| 5,035,496 A | 7/1991 | An | 350/605 |
| 5,050,977 A | 9/1991 | Platzer, Jr. | 359/866 |
| 5,097,362 A | 3/1992 | Lynas | 359/843 |
| 5,115,352 A | 5/1992 | do Espirito Santo | 359/855 |
| 5,140,455 A | 8/1992 | Varaprasad et al. | 359/275 |
| 5,142,407 A | 8/1992 | Varaprasad et al. | 359/276 |
| 5,151,816 A | 9/1992 | Varaprasad et al. | 359/275 |
| 5,159,497 A | 10/1992 | Lynas | 359/843 |
| 5,189,561 A | 2/1993 | Hong | 359/843 |
| 5,293,265 A * | 3/1994 | Aleshin et al. | 359/198 |
| 5,311,368 A | 5/1994 | Tsuyama | 359/874 |

(List continued on next page.)

FOREIGN PATENT DOCUMENTS

| | | |
|---|---|---|
| DE | 3926560 A1 | 2/1991 |
| EP | 551246 A1 | 7/1993 |
| JP | 6483431 | 3/1989 |
| JP | 6191349 | 7/1994 |

*Primary Examiner*—Mohammad Sikder
(74) *Attorney, Agent, or Firm*—Van Dyke, Gardner, Linn & Burkhart, LLP

(57) ABSTRACT

A vehicular exterior rearview mirror blind spot viewing system includes an exterior rearview mirror assembly which enables moving the reflective mirror element to an alternate position for viewing of areas adjacent the vehicle which otherwise would be hidden in the driver's blind spot. The blind spot system includes a reflective mirror element mounted on a pivot member such as an electric actuator for adjusting the field of view of the mirror element for different drivers about an axis which is preferably centered on the mirror element. A support member has a joint spaced laterally of the axis and pivotally connected to the pivot member for moving the mirror element between a first rearward viewing position and a blind spot viewing position. A power source such as an electric motor is preferably mounted on the pivot member and is spaced from the support member joint, and includes a threaded member pivotally connected to the support member and driven by a gear. The electric motor is preferably connected via a control circuit to a remote switch such as in the passenger compartment to allow the driver to pivot the support member and mirror element for blind spot viewing when desired.

49 Claims, 17 Drawing Sheets

U.S. PATENT DOCUMENTS

| | | | |
|---|---|---|---|
| 5,479,297 A | 12/1995 | Summers | 359/841 |
| 5,497,306 A | 3/1996 | Pastrick | 362/83.1 |
| 5,500,766 A | 3/1996 | Stonecypher | 359/605 |
| 5,519,336 A | 5/1996 | Russell | 350/289 |
| 5,668,663 A | 9/1997 | Varaprasad et al. | 359/608 |
| 5,669,699 A | 9/1997 | Pastrick et al. | 362/83.1 |
| 5,745,310 A * | 4/1998 | Mathieu | 359/843 |
| 5,823,654 A | 10/1998 | Pastrick et al. | 362/83.1 |
| 5,900,999 A | 5/1999 | Huizenga et al. | 359/877 |
| 5,910,854 A | 6/1999 | Varaprasad et al. | 359/273 |
| 5,986,364 A | 11/1999 | Bingle et al. | 310/51 |
| 6,019,475 A | 2/2000 | Lynam et al. | 359/879 |
| 6,094,027 A | 7/2000 | Willmore et al. | 318/652 |
| 6,116,742 A | 9/2000 | Ahn | 359/843 |
| 6,168,279 B1 | 1/2001 | Schnell | 359/872 |
| 6,176,602 B1 | 1/2001 | Pastrick et al. | 362/494 |
| 6,213,612 B1 | 4/2001 | Schnell et al. | 359/877 |
| 6,243,218 B1 | 6/2001 | Whitehead | 359/877 |
| 6,276,821 B1 | 8/2001 | Pastrick et al. | 362/494 |
| 6,485,155 B1 * | 11/2002 | Duroux et al. | 359/877 |

* cited by examiner

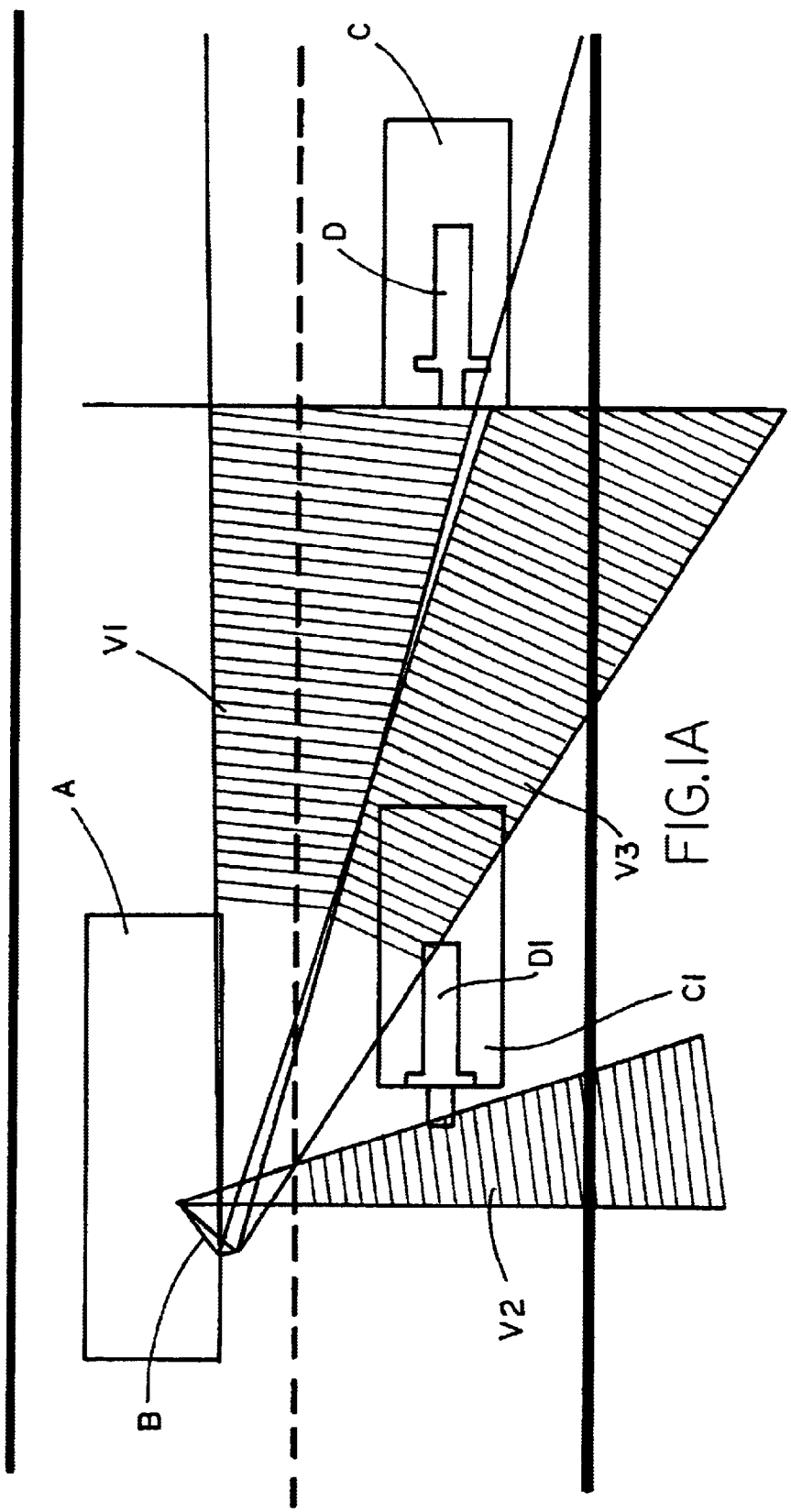

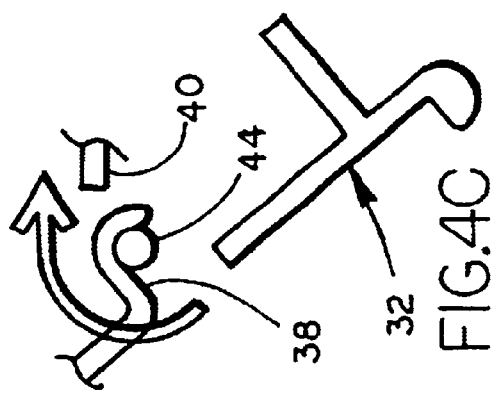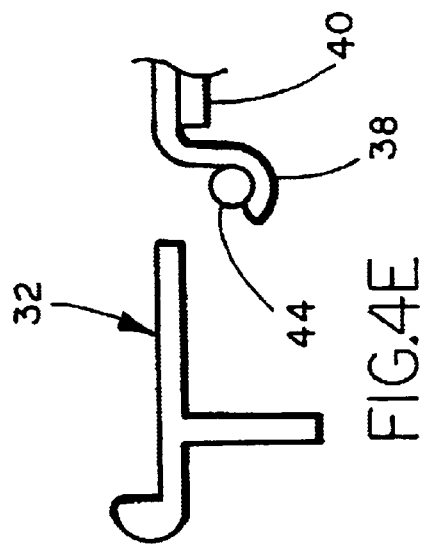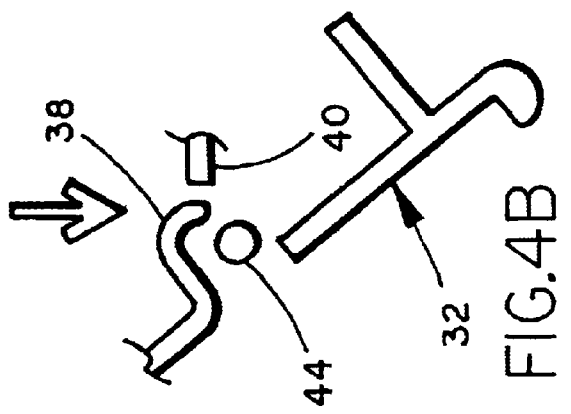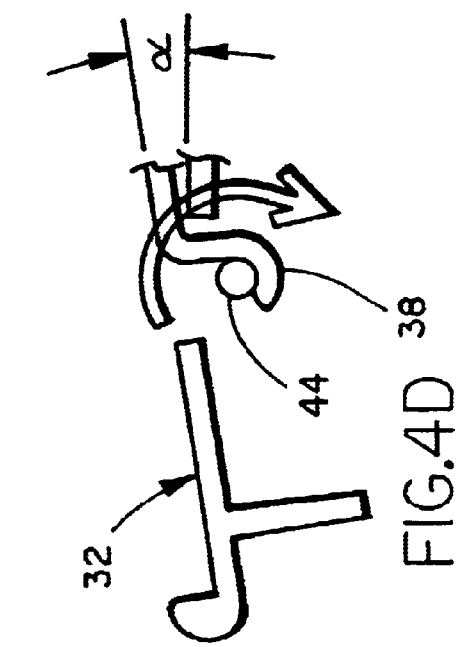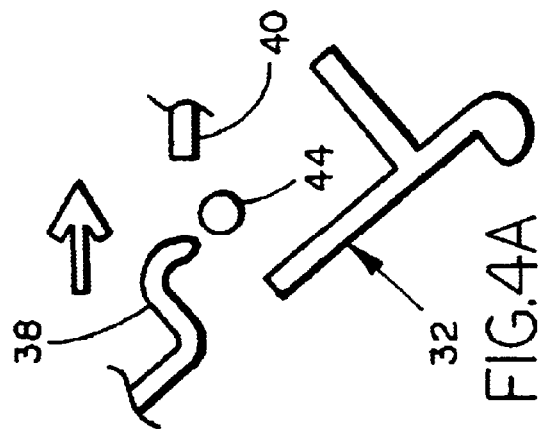

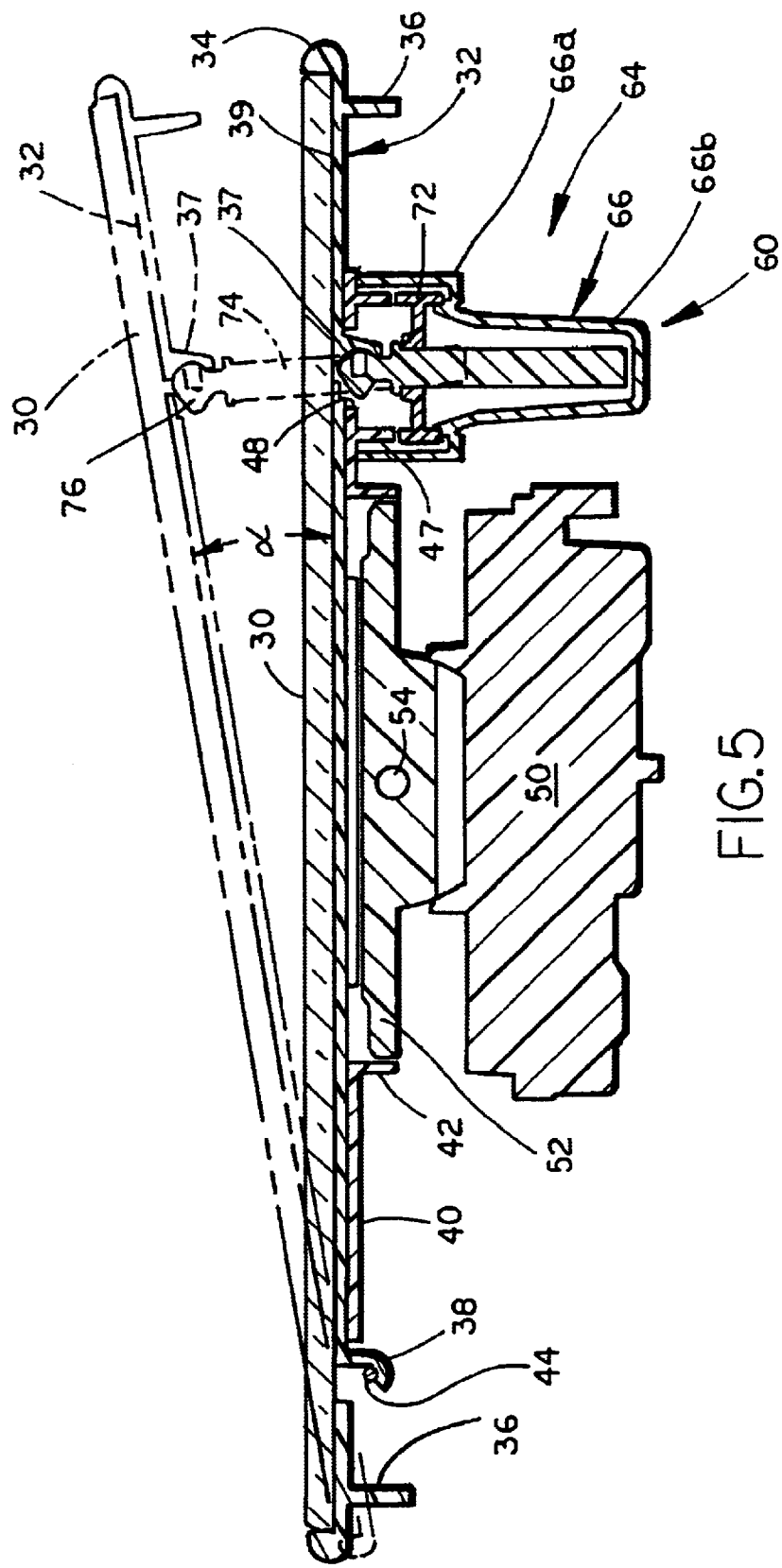

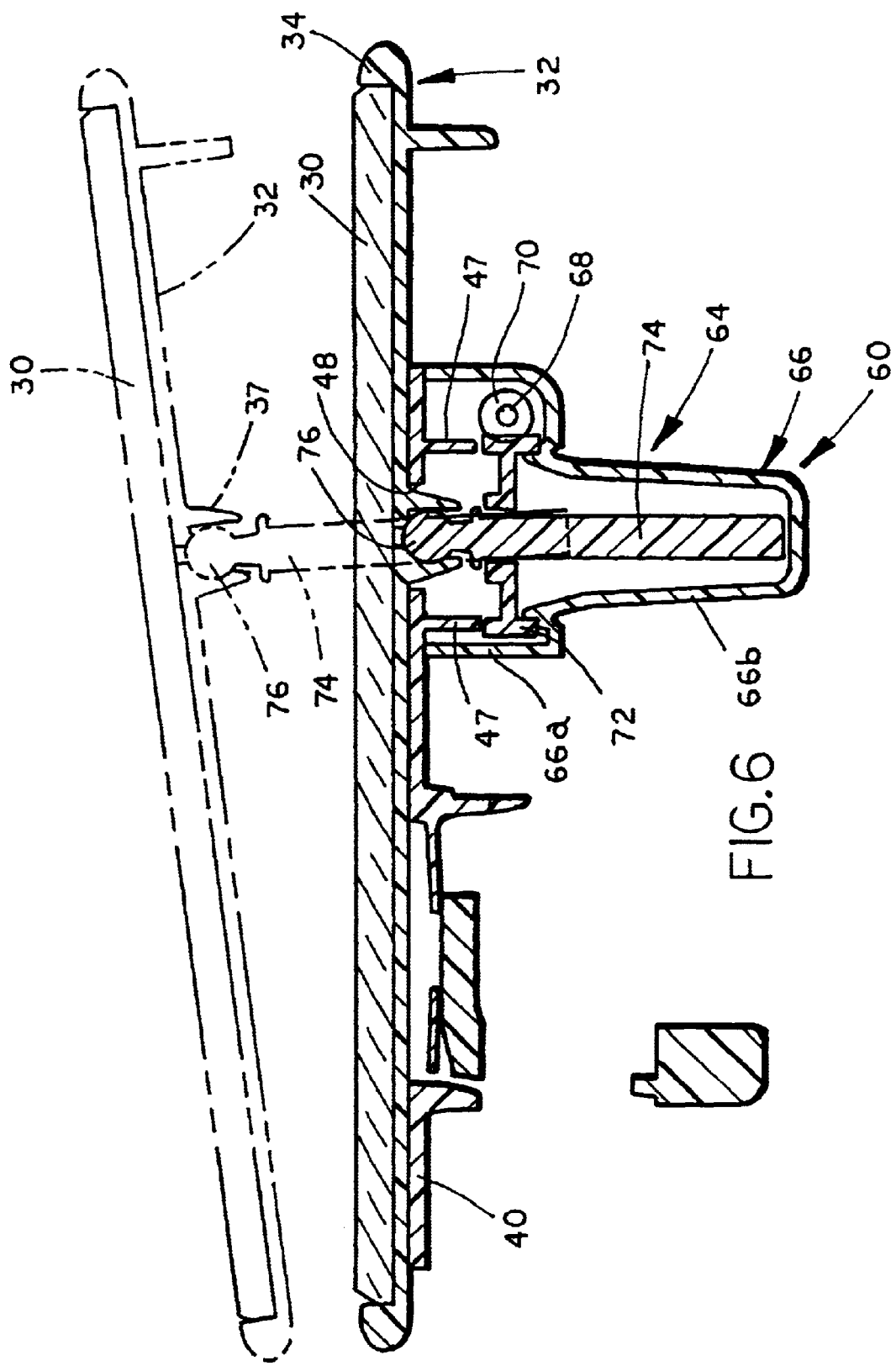

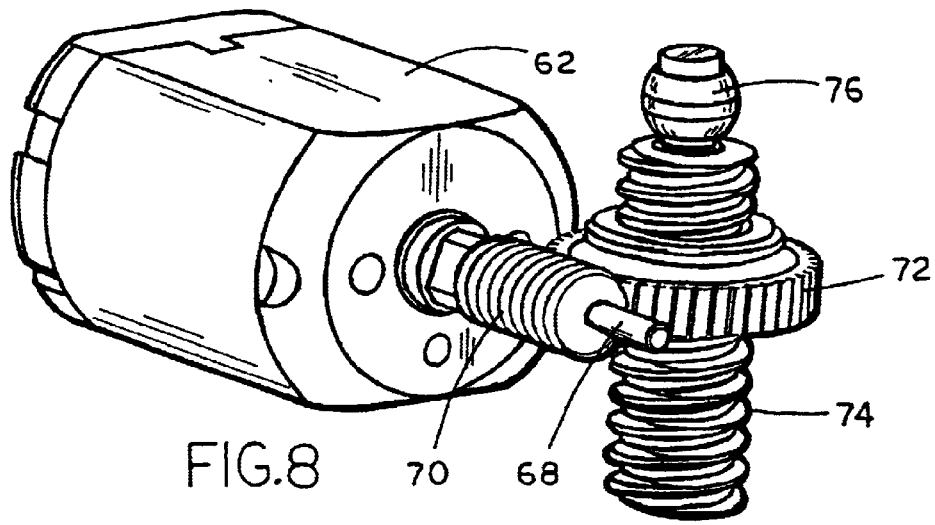
FIG.8
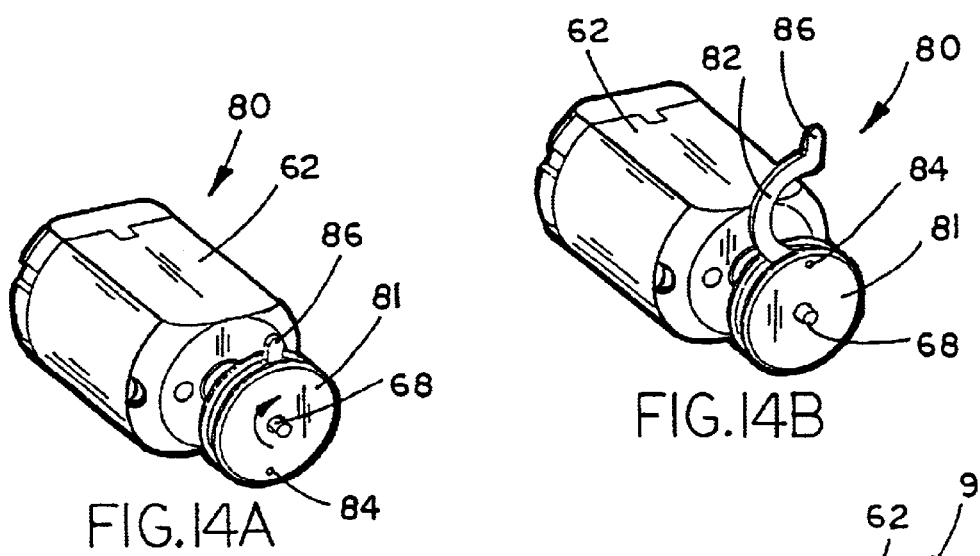
FIG.14A
FIG.14B
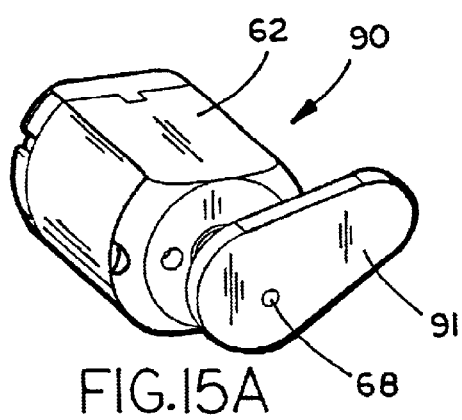
FIG.15A
FIG.15B

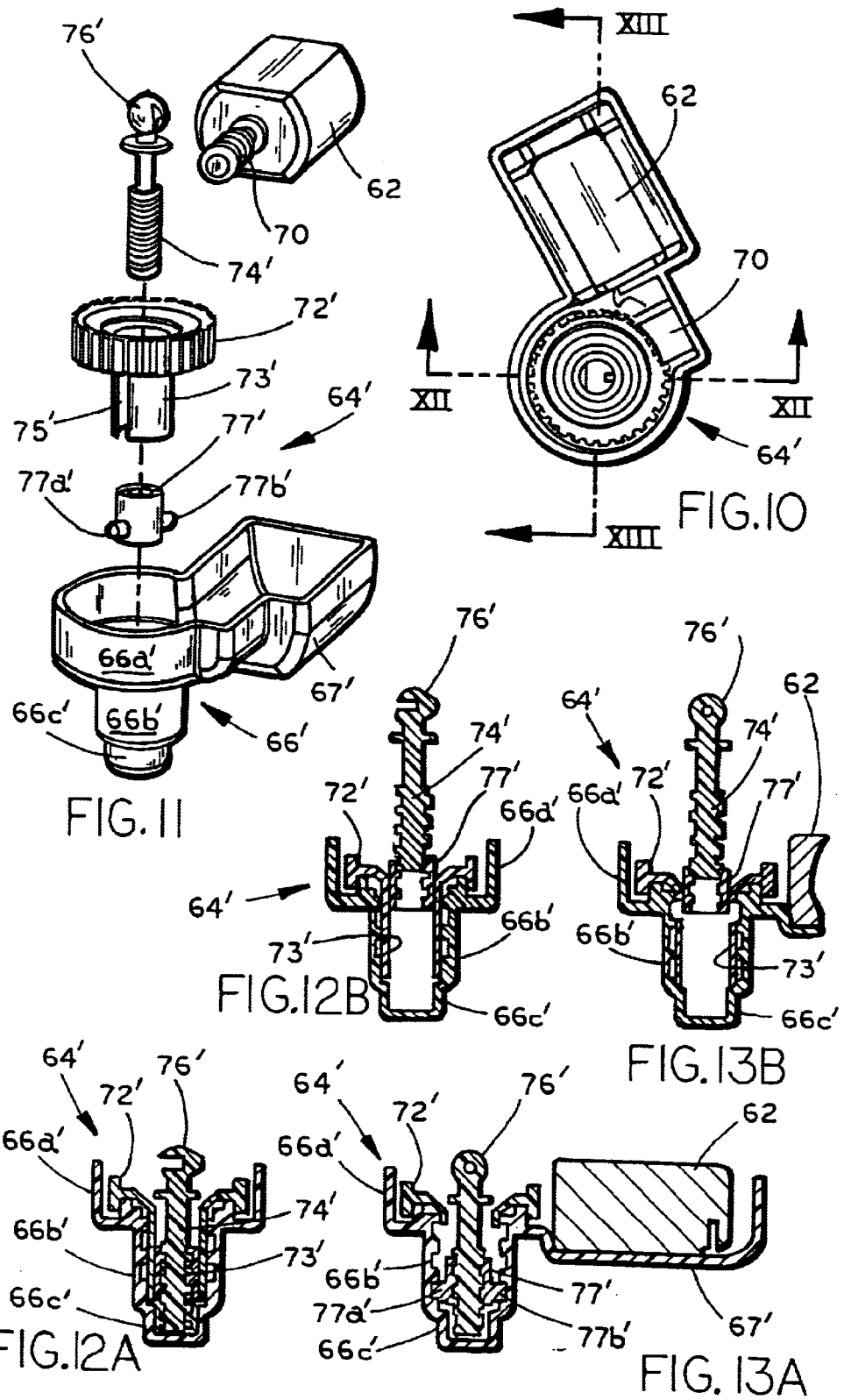

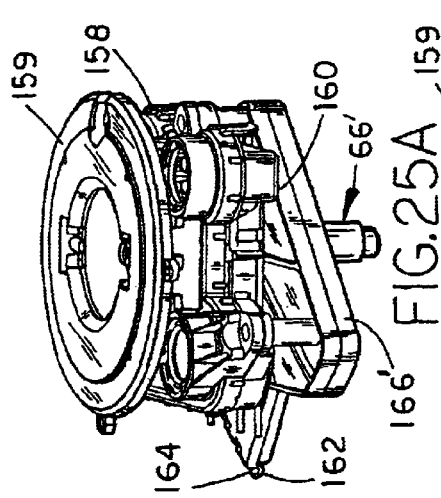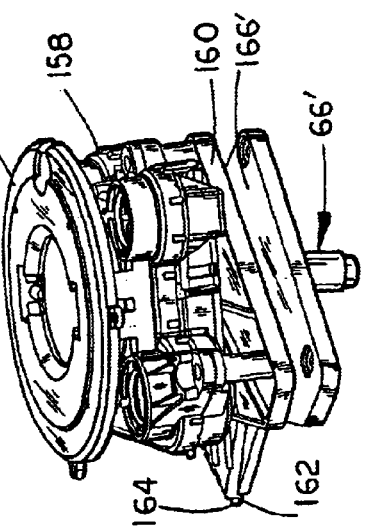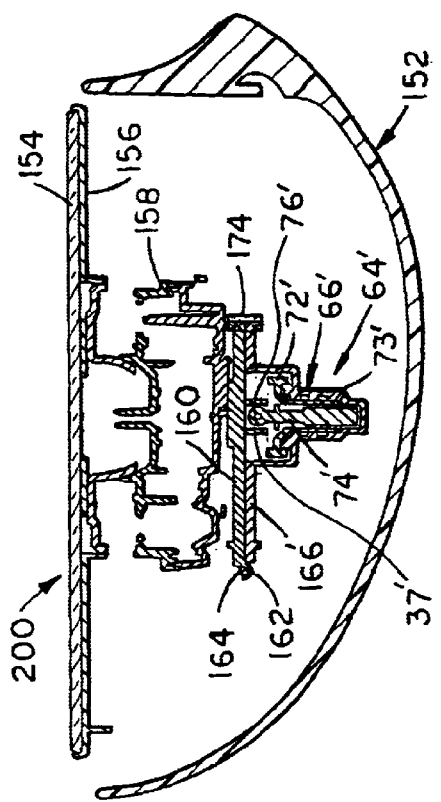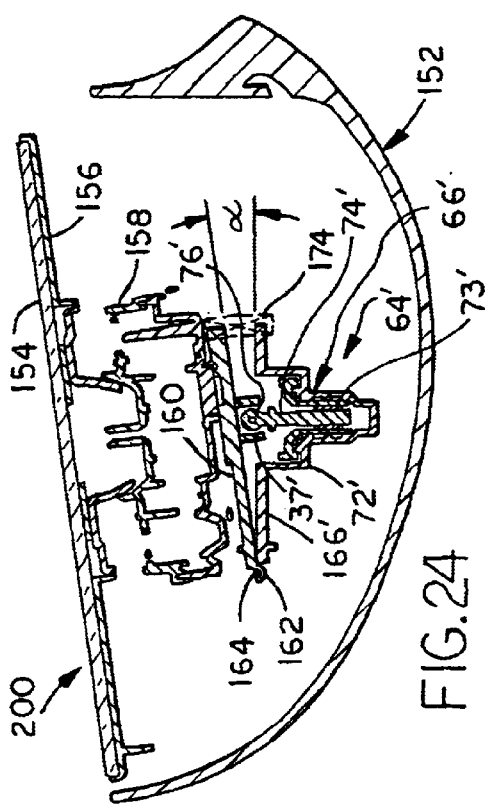

VEHICULAR REARVIEW MIRROR WITH BLIND SPOT VIEWING SYSTEM

CROSS REFERENCE TO RELATED APPLICATION

This application claims priority from U.S. provisional patent application Ser. No. 60/252,149, filed Nov. 20, 2000, the disclosure of which is hereby incorporated by reference herein in its entirety.

BACKGROUND OF THE INVENTION

This invention relates to exterior rearview mirrors for vehicles and, more particularly, to a vehicular rearview mirror system allowing repositioning of the mirror reflector for desired time periods to view areas adjacent the vehicle which otherwise would be hidden from view in the driver's blind spot to improve safety during lane changes, merging with or passing of other vehicles.

Continuing efforts to improving occupant safety in the automotive and vehicular industry has recently focussed attention on the unsafe condition when driving a vehicle known as the "blind spot." In the typical rearview mirror system incorporated in most vehicles today, an interior rearview mirror assembly is mounted on the inside of the vehicle and includes a mirror reflector used by the driver to view rearwardly of the vehicle to judge traffic to allow passing, lane changes, operation in reverse and the like. In conjunction with the interior rearview mirror assembly, a passenger side and/or driver side exterior mirror assemblies are normally used by the driver to extend the field of view both laterally and rearwardly of the vehicle. However, when using both the interior and exterior mirror reflectors of such assemblies, a driver normally encounters an area next to the vehicle that cannot be viewed with either the interior or exterior mirror reflector. When passing another vehicle, changing lanes on a highway or merging into freeway traffic, such a blind spot experienced by the driver using existing mirror systems can often hide an adjacent vehicle leading to potentially injurious conditions or accidents.

To improve a driver's vision and help reduce blind spots while driving, a blind spot actuator can be added to an exterior rearview mirror assembly which will quickly reposition the reflective surface of the mirror when activated such that the blind spot size decreases greatly or is eliminated. When deactivated, the blind spot actuator quickly returns the reflective mirror surface to its original position for normal rearward viewing.

A variety of blind spot actuators have been previously proposed. One prior known assembly includes a hinge plate, spring and electric motor combination incorporated in the exterior rearview mirror. When in the normal driving position, the electric motor is deactivated and the spring is retracted. However, when activated, the electrical motor drives a gear mechanism to change the angular position of the mirror. Electric power is continuously supplied to the motor in order to hold the mirror in the extended position. When power is removed, the force applied by the motor is removed and the spring applies a return force to the mirror which urges the mirror back to its normal position. Such an assembly, however, requires the motor to be in a stall position with electrical power applied as long as the driver desires to view the blind spot. Since the blind spot actuator will be used very frequently by a vehicle driver, the large cycle requirement for the assembly in which the stall position is maintained in each cycle reduces the life of the electric motor.

In addition to severe requirements for the drive motor, the above system may experience significant vibration distortion for the driver when viewing the system while driving on a highway. For example, the spring which is extended when the blind spot actuator is activated is in a relaxed position when the reflective surface is in the normal position. This allows road shocks and other vibration to affect the mirror. In addition, the drive motor assembly is attached to the mirror holder. Such additional weight of the drive motor may degrade the vibration performance of the reflective surface.

Further, many prior known electrically operated blind spot actuator systems such as that shown in U.S. Pat. No. 4,834,522 to Janowicz U.S. Pat. Nos. 4,971,430; 5,097,362; and 5,159,497 to Lynas; U.S. Pat. No. 5,033,835 to Platzer, Jr.; and U.S. Pat. No. 5,745,310 to Mathieu have rotated the reflective surface of the mirror about a pivot axis centered within a surrounding mirror housing. Because of such positioning, the remote ends of the reflective mirror surface must travel a significant distance within the housing to accommodate all necessary adjustment positions. Such movement requires additional space within the mirror housing and reduces the amount of available housing area useful for positioning other required mirror assembly components. In addition, the pivot supports for the reflective mirror element in such prior known systems including the above Janowicz, Lynas and Mathieu patents have been of significant size and cause the reflective mirror surface to be positioned a large distance from the center of the adjustment mechanism. This likewise decreases vibration performance of the overall assembly and creates manufacturing difficulties in forming an interchangeable system in which a single mirror housing can include either a blind spot actuator or a normal mirror glass as desired.

Therefore, prior known blind spot actuating systems for rearview mirror assemblies have suffered from a lack of reliability and short cycle life, decreased vibration performance, a lack of efficient use of space within the mirror housing, and reduced ability to provide system interchangeability.

SUMMARY OF THE INVENTION

Accordingly, the present invention provides a vehicular exterior rearview mirror assembly blind spot viewing system which overcomes problems encountered with the prior known systems and provides a versatile, lower cost, reliable blind spot actuator having improved vibration performance for use on vehicles such as automobiles and trucks.

In one form, the invention is an exterior rearview mirror assembly blind spot viewing system for vehicles comprising an exterior rearview mirror assembly including a reflective mirror element, and a pivot member for pivotally mounting the reflective mirror element on the assembly to adjust the position of the mirror element for different fields of view for different vehicle drivers. The pivot member pivotally mounts the mirror element on an axis generally aligned with the center of the mirror element. A support member includes a joint for movably mounting the reflective mirror element between a first rearward viewing position and a blind spot viewing position. The joint is spaced laterally outwardly of the center axis. A motive power source is provided for moving the support member and the reflective mirror element on the joint between the first rearward viewing position and the blind spot viewing position. The motive power source includes an electric motor, a gear and a threaded member driven for extension and retraction by the electric motor and gear. The blind spot viewing position provides an enhanced field of view for the vehicle driver in the area adjacent the vehicle on which the assembly is mounted.

In another form of the invention, the pivot member pivotally mounts the mirror element on an axis at a predetermined position with respect to the mirror element. The joint of the support member is spaced laterally on one side of the axis at a first position, while the motive power source including an electric motor, gear and threaded member is mounted on the pivot member at a position spaced laterally on another side of the axis generally opposite to the first position.

In a further form of the invention, the motive power source including an electric motor, gear and threaded member is mounted on the pivot member at a position spaced from the axis, while the threaded member is pivotally secured to the pivot member.

Preferably, the threaded member may include a threaded post pivotally joined to the support member. Alternately, the electric motor includes a crank member pivotally secured between the motor, gear and support member. In yet another form, the threaded member, which is extended and retracted by the motor and gear, may include a push/pull cable connected to the support member.

In a preferred form of the invention, the pivot member includes an actuator for adjusting the mirror element position, the actuator preferably being an electric actuator remotely controlled from the interior of the vehicle on which the assembly is mounted. The support member is movably mounted on the pivot member such that the joint therebetween positioned adjacent the peripheral edge of the mirror element. More preferably, the support member may include a backing member secured to the mirror element while the assembly includes a housing. The actuator is fixedly mounted to the housing and the pivot member includes a pivot plate pivotally secured to the actuator on the center axis. The joint extends between the pivot plate and the backing member.

In another form of the invention, the assembly includes a housing and a mounting plate within the housing. The pivot member includes an actuator, such as an electric actuator, for adjusting the mirror element position, the actuator being fixedly mounted on the support member. The joint extends between the support member and the mounting plate such that when the mirror assembly is moved to the blind spot viewing position, the support member, pivot member including the actuator and the reflective mirror element are all moved in unison.

In various other forms of the invention, the motive power source may include a muscle wire or an electric solenoid and one of various forms of connection to the support member.

In other preferred aspects of the invention, an electrical control for the motive power source is provided for ease of use by all vehicle drivers. In one form, a switch may be activated by the driver to move the reflective mirror element to the blind spot viewing position and to return to the normal rearward viewing position upon release of the switch. A current limiting device is preferably incorporated to limit the current applied to the electric motor or to shut off the electric current when the motor is in the blind spot viewing position. Alternately, other switch devices could be used such as a push-push switch in which the driver pushes a button or other activating member to move the reflective mirror element to the blind spot viewing position and pushes the same activating member to return the mirror element to its normal rearward viewing position when desired. Alternately, an on/off type switch can be used to move the reflective mirror element to its blind spot viewing position after which the switch is moved to the alternate position to return the mirror element to its normal rearward viewing position.

The present invention overcomes numerous problems encountered with prior blind spot viewing systems in exterior vehicular rearview mirrors by providing a reliable, long lasting easily manufactured assembly which allows momentary actuation to view the blind spot area when changing lanes, merging, or passing another vehicle without requiring significantly increased space within the rearview mirror housing. One of several types of electric drive motors can be incorporated which do not require continued application of electric power while in the blind spot viewing position and, therefore, have significantly increased life span and cycle capacity. In addition, the structure of the present invention improves vibration performance over other known systems and reduces unwanted blurring in the reflective mirror element when viewed by the vehicle driver. In addition, the blind spot viewing system of the present invention may be incorporated in an exterior rearview mirror on either the driver or passenger side of the vehicle to enable viewing of blind spots on either side of the vehicle.

These and other objects, advantages, purposes and features of the invention will become more apparent from a study of the following description taken in conjunction with the drawings.

BRIEF DESCRIPTION OF THE DRAWINGS

FIGS. 1A and 1B are schematic illustrations of the normal rearward viewing areas visible in a driver's side exterior vehicular rearview mirror and the enhanced/increased viewing area visible when the reflective mirror element is moved to the preferred blind spot viewing position;

FIGS. 4A–4E are a series of partial sections illustrating the assembly sequence for attaching the mirror element support member to the pivot member in FIG. 2;

FIG. 5 is a sectional view of the blind spot viewing system of the rearview mirror assembly of FIG. 2 taken along plane IV—IV of FIG. 3;

FIG. 6 is a sectional view of the blind spot viewing system of the assembly of FIG. 2 taken along plane VI—VI of FIG. 3;

FIG. 8 is a perspective view of the electric motor and drive system for the blind spot viewing system of FIGS. 2, 3 and 5–7;

FIG. 10 is a plan view of the electric motor drive assembly of FIG. 9 illustrating the electric motor, gear drive and threaded post;

FIG. 11 is an exploded, perspective view of the electric motor drive assembly of FIG. 10;

FIGS. 12A and 12B are sectional elevations taken along plane XII—XII of FIG. 10 with the threaded post in its retracted and extended positions;

FIGS. 13A and 13B are sectional views taken along plane XIII—XIII of FIG. 10 also illustrating the threaded post of the assembly in retracted and extended positions;

FIGS. 14A and 14B are perspective views of an alternate electric motor and drive assembly for the blind spot viewing system;

FIGS. 15A and 15B are perspective views of another alternate electric motor and drive assembly for the blind spot viewing system;

FIG. 23 is a sectional view of a further embodiment of an exterior rearview mirror assembly for vehicles incorporating the blind spot viewing system of the present invention and similar to the embodiment of FIGS. 19–22 but including an alternate power source for the blind spot viewing system;

FIG. 24 is a sectional view of the rearview assembly of FIG. 23 with the reflective mirror element shown pivoted to the blind spot viewing position; and FIGS. 25A and 25B are perspective views of the support assembly for the reflective mirror element of FIGS. 23 and 24 in the normal rear viewing position and in the blind spot viewing position, respectively.

DESCRIPTION OF THE PREFERRED EMBODIMENTS

Figure 1B:
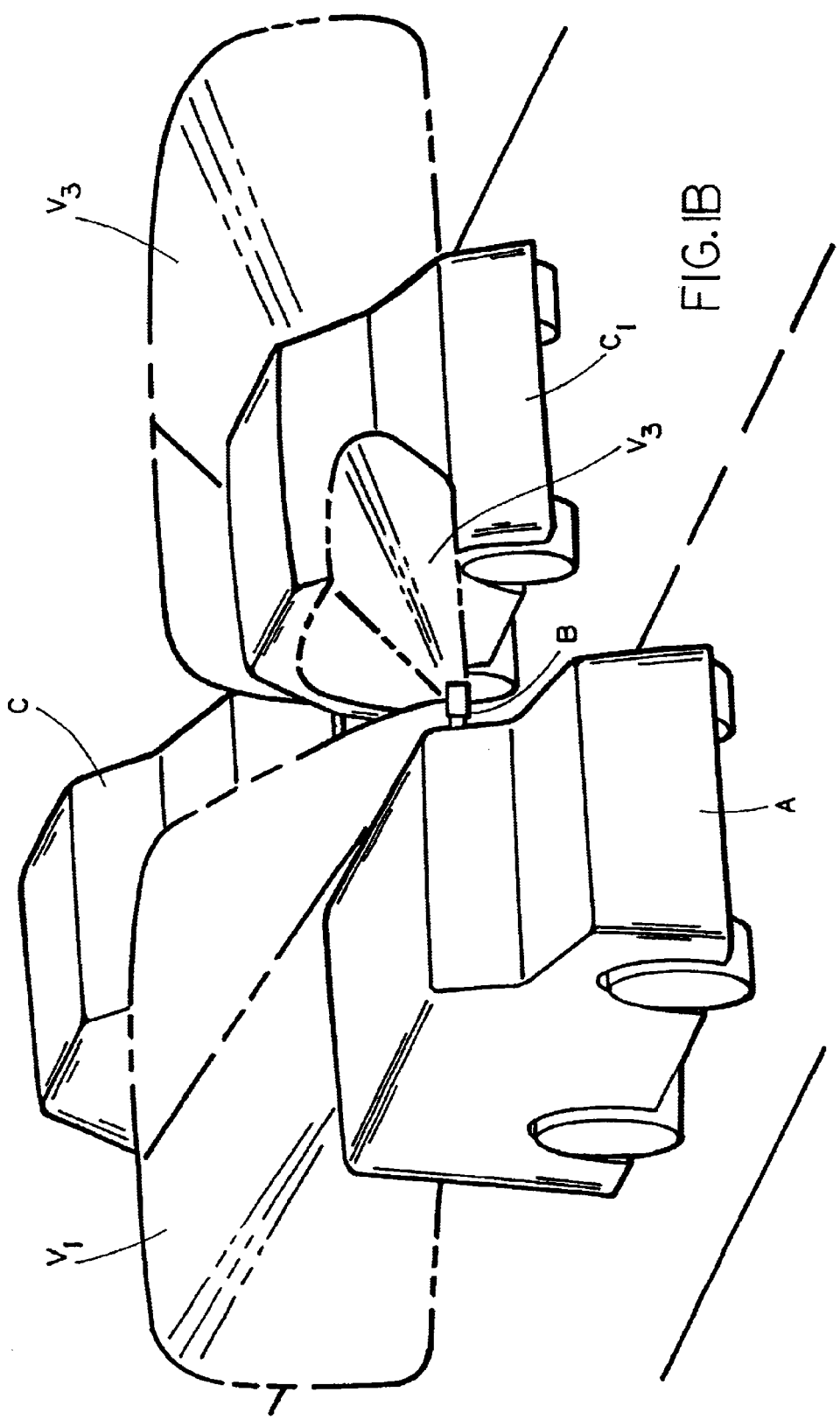
Figure 2:
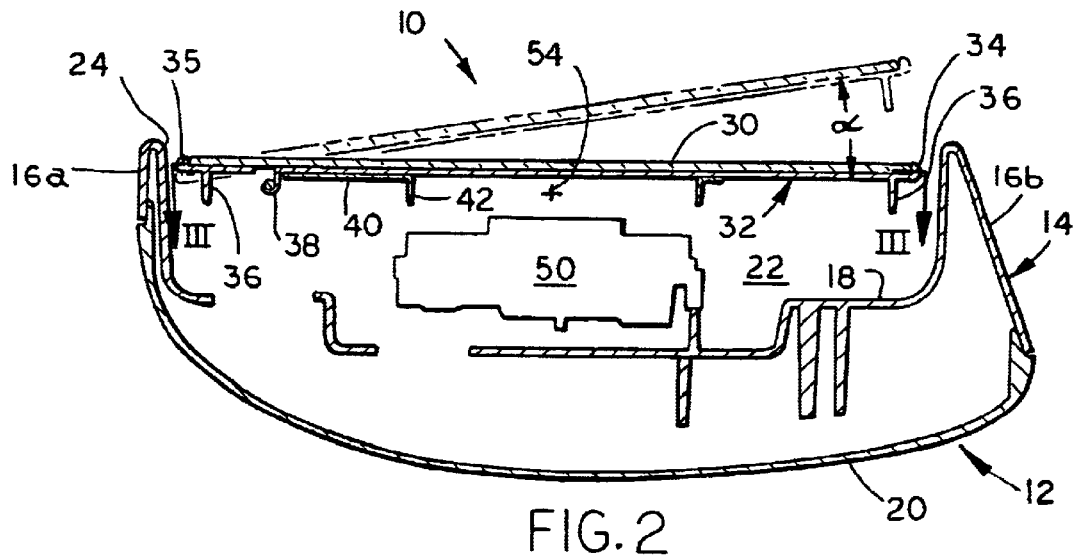
FIG. 2 is a sectional plan view of one of embodiment of an exterior rearview mirror assembly for vehicles incorporating a blind spot viewing system of the present invention.
Figure 3:
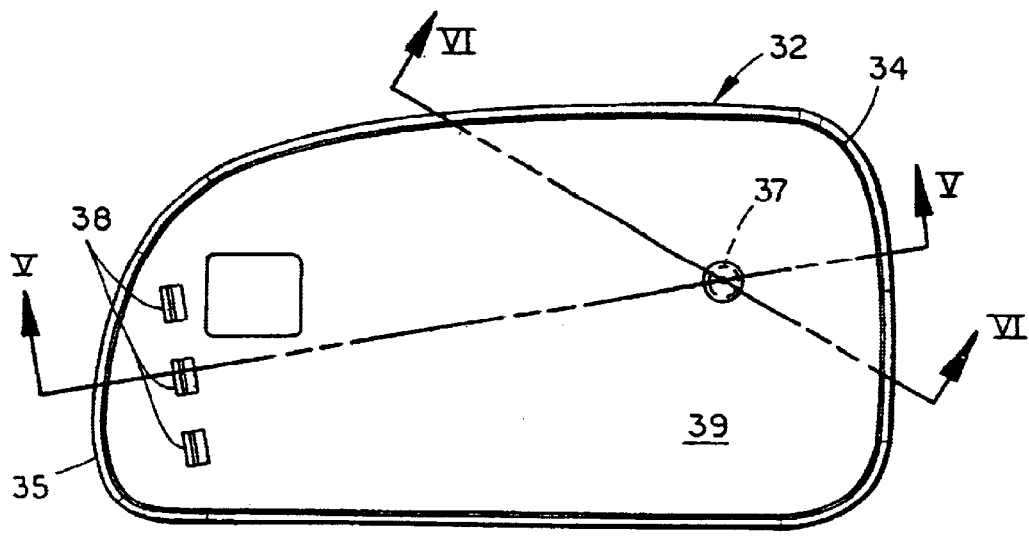
FIG. 3 is an elevation of the rear facing side of the reflective mirror element support member of the assembly of FIG. 2 taken along plane III—III of FIG. 2.

Referring now to the drawings in greater detail, FIGS. 1A and 1B illustrate a typical driving situation in which a driver in a vehicle A such as an automobile or truck uses a driver's side exterior rearview mirror B for rearward viewing of traffic which may be approaching or present to the rear of vehicle A. From the typical driver's position with exterior mirror assembly B properly adjusted, the driver can view areas $V_1$ and $V_2$ via the mirror. As such, area $V_1$ would encompass and provide a view of other automobiles or trucks C or motorcycles D which are sufficiently to the rear of vehicle A. However, for vehicles or motorcycles $C_1$ or $D_1$ in the area between viewing areas $V_1$ and $V_2$, the driver of vehicle A could not view those vehicles in mirror B or would see such a small portion thereof that those vehicles would be substantially invisible. The area between areas $V_1$ and $V_2$ therefore encompasses a blind spot for the driver of vehicle A. However, when the reflective mirror element of mirror assembly B is pivoted outwardly and at an angle to the vertical which depends on the specific vehicle, such as outwardly at approximately 9° at an angle to the vertical of approximately 5° down, the driver can view the area $V_3$ thereby allowing him to view vehicles including automobiles, trucks and motorcycles which would otherwise be within his or her blind spot thereby substantially increasing the safety for driving vehicle A such as during lane changes, merging onto freeways, or passing other vehicles.

Referring now to FIGS. 2–8, a first embodiment 10 of an exterior rearview mirror assembly incorporating a blind spot viewing system of the present invention is illustrated. Mirror assembly 10 includes a mirror housing 12 which may be molded from a suitable polymeric material for strength and resilience and includes a bezel portion 14 having side or end walls 16a, 16b and an interior wall 18 molded integrally therewith to include support structure for mounting elements to be received within the housing 12. Housing 12 also includes a forward wall 20 secured to the forward facing edge of bezel portion 14 to close the mirror assembly and provide an exterior, forward facing surface which may be painted or otherwise finished in a desired color such as to match the exterior color of the vehicle on which the assembly is mounted. Bezel portion 14 defines an interior cavity 22 and a rear facing opening 24 within which a reflective mirror element and its support structure is mounted.

Figure 7:
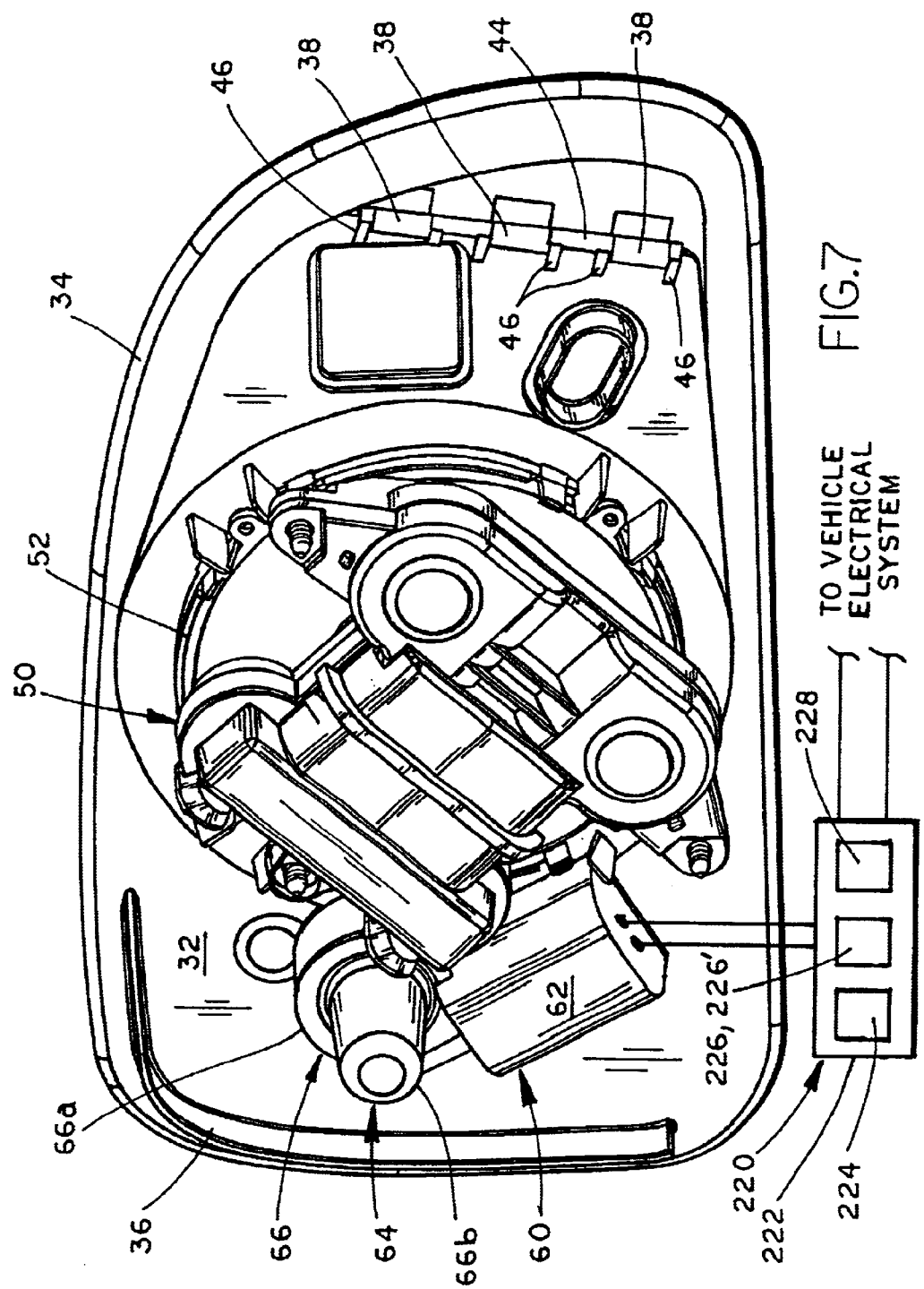
FIG. 7 is a rear perspective view of the blind spot viewing system of FIG. 2 including the mirror element electric actuator.
Figure 9:
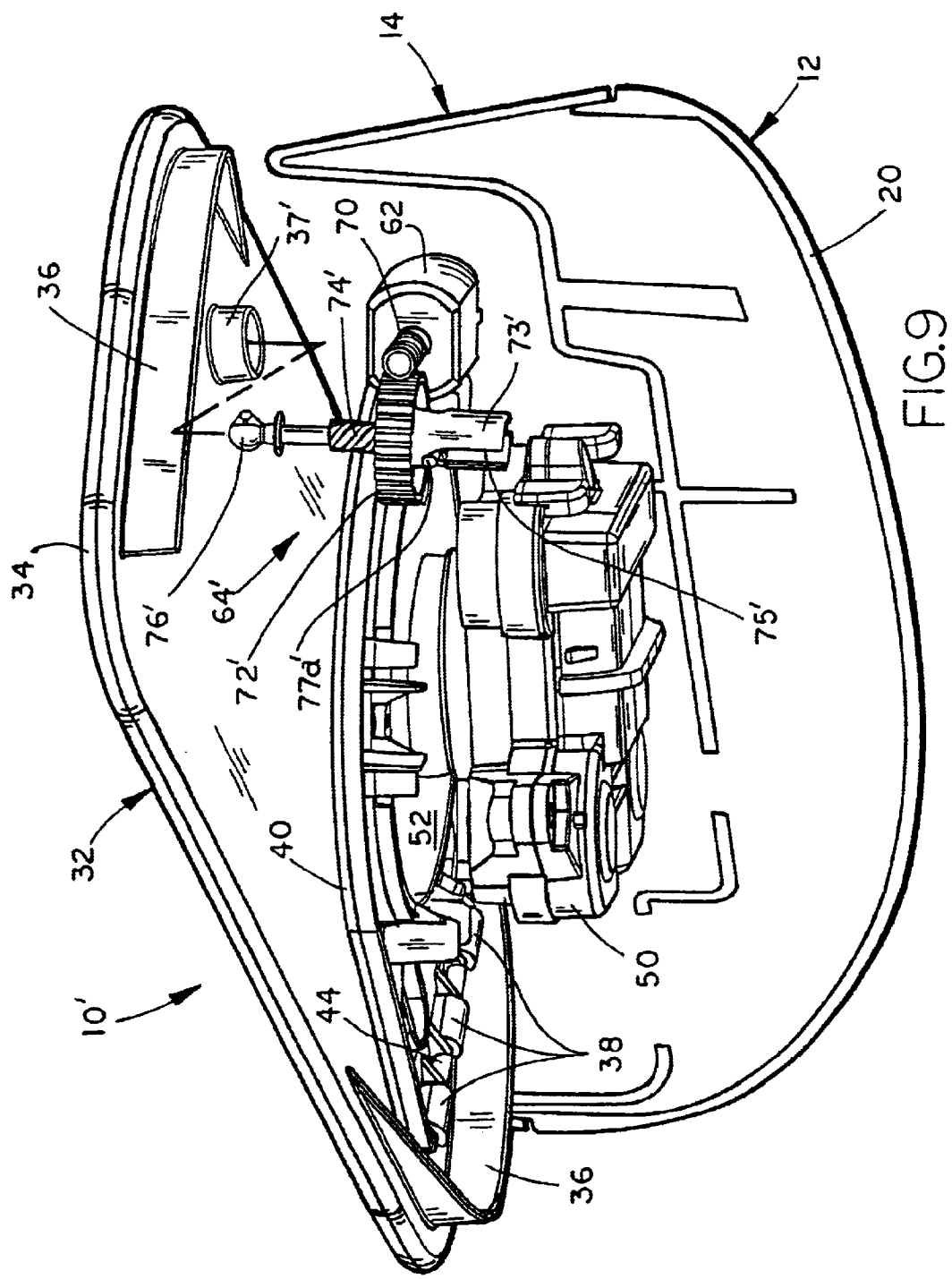
FIG. 9 is a perspective view with portions broken away of another embodiment of the exterior rearview mirror assembly for vehicles incorporating a blind spot viewing system similar to that of FIGS. 2, 3 and 5–7 but having a modified electric motor drive assembly.

As is best seen in FIGS. 2, 3 and 5–8, a reflective mirror element 30, preferably formed from a sheet of planar or curved glass and having a coating of conventionally known reflective material such as aluminum, chrome or alloys thereof on its first or front surface or on its second or rear surface, is mounted on a mirror holder or support member 32 having an elongated shape. Support member 32 is preferably molded from a resinous polymeric material and includes an upstanding lip or edge 34 at its periphery, a forwardly extending, molded rib 36 adjacent the periphery for providing stiffness and strength, and a series of J-shaped projecting clip-like hinge members 38 aligned with one another adjacent the periphery of support member 32 near its outer edge 35. Mirror element 30 is preferably secured by a suitable adhesive on the rearward facing surface 39 of the support member. Preferably, support member 32 is hingedly secured to a molded, resinous polymeric pivot member or pivot plate 40 which may be mounted either on a manual or electric actuator for adjusting the position of the pivot member, support member and reflective mirror element for different fields of view for different vehicle drivers from a remote position typically within the passenger compartment of the vehicle on which the mirror assembly is mounted. Preferably, pivot plate 40 includes a forwardly extending, upstanding circular rib 42 which is received around the periphery of a correspondingly shaped actuator mount 52 which, in turn, is universally pivotally secured to the rearward facing side of an electric actuator 50 via a pivot 54 (FIG. 5). Electric actuator 50 may be any of numerous conventional electric actuator units a suitable one of which may be obtained from Donnelly Corporation of Holland, Mich., under Model No. D16 or MM1 or such as those actuators disclosed in U.S. Pat. No. 5,900,999, No. 5,986,364, No. 6,168,279, No. 6,213,612, No. 6,243,218, and No. 6,094,027, the disclosures of which are hereby incorporated by reference herein. Actuator 50 is fixedly secured within the interior of housing 14 on interior wall 18. Pivot plate 40 also includes an axle 44 spaced forwardly of the forward surface of pivot member 40 on upstanding legs or projections 46 (FIGS. 4,5 and 7). Axle 44, which can be formed from metal or plastic, such as by molding the axle with pivot plate 40, is adapted to snap fit within hinge members 38 as will be described more fully below. As will also be described more fully below, axle 44 is positioned at an angle to the vertical such that when support member 32 is pivoted to the blind spot viewing position with mirror element 30, an appropriate blind spot viewing area will be seen in the mirror surface.

As shown in FIGS. 5–8, a motive power source 60 is mounted on the interior, forward side of pivot plate 40 adjacent the end of the pivot plate which is opposite to the end which includes axle 44 on the opposite side of the actuator mounting rib 42. Pivot plate 40 includes an upstanding cylindrical rib 47 on the interior surface of plate 40 spaced radially outwardly from an aperture 48 through which an actuating member comprising a threaded rod 74 or the like is driven to move support member 32 and reflective mirror element 30 in unison to the blind spot viewing position. Secured to the mounting area adjacent aperture 48 and rib 47 is a power source assembly 60 including an electric motor 62 and a gear drive assembly 64. Gear drive assembly 64 includes a generally cylindrical outer shell or housing 66 having a cylindrical base portion 66a and an integral, upstanding conical portion 66b. Housing 66 is adhered or otherwise secured to the interior side of pivot plate 40 adjacent rib 47 such that it is coaxial with aperture 48 and has its weight supported by plate 40.

As is best seen in FIGS. 5–8, electric motor 62 is mounted on pivot plate 40 adjacent gear drive assembly 64. Motor 62 includes a drive shaft 68 on which a worm gear 70 is mounted for engagement with a ring gear 72 rotatably mounted within cylindrical housing portion 66a as shown in FIGS. 5 and 6. Ring gear 72 is internally threaded for engagement with threaded post 74 which, when ring gear 72 is driven by motor 62 via shaft and worm gear 70, extends or retracts the threaded post as well as pivot support member or mirror holder 32 toward and away from pivot plate 40. At the upper end of threaded post 74 is a ball member 76 integrally formed therewith for receipt in a socket 37 formed on the interior side of support member 32. Socket 37 is positioned on the opposite side of actuator 50 from hinge members 38 (see FIGS. 3 and 8). When threaded post 74 is extended and retracted to pivot support member 32 and, thus, reflective mirror element 30 about axle 44 on hinge members 38, the threaded post can tilt or shift laterally to accommodate the pivotal movement of support member 32 as compared to the axis of aperture 48 and housing 66 as shown in FIG. 6. Preferably, electric motor 62 is of the type manufactured by Mabuchi Motor of Japan under Model No. FK 130 RD.

As shown in FIG. 4, mirror holder or support member 32 is preferably assembled to pivot plate 40 by holding support member 32 inverted with its rear surface adjacent axle 44 such that hinge members 38 are adjacent the axle (FIG. 4A). The support member is then moved toward axle 44 downwardly over the axle until the axle (FIG. 4B) is received on the curved interiors of the aligned hinge members (FIG. 4C). The support member is then rotated until it is in contact with pivot plate 40 thereby retaining axle 44 in hinge members 38 (FIGS. 4D and 4E).

As will now be understood, especially from FIGS. 2, 5, 6 and 8, actuation of motor 62 and gear assembly 64 will extend threaded post 74 and pivot support member 30 about hinge axle 44 through an angle α which is preferably within the range of about 2 degrees to about 20 degrees, more preferably about 4 degrees to about 16 degrees and most preferably about 7 degrees to about 11 degrees. Preferably, motor 62 is a reversible, high torque, high rpm electric motor which rotates shaft 68 at high speed to rapidly extend and/or retract threaded post 74 upon application of electric current to the motor for substantially immediate pivoting of support member 30. As will be understood from FIG. 2, the pivotal motion of the support member and mirror element is outwardly away from housing 12 with only a small marginal area of the support plate between hinge members 38 and its outer periphery 35 extending slightly inwardly within the housing. Thus, because the hinge axis of axle 44 and hinge members 38 is spaced laterally outwardly from the centered position of pivot 54 to the position adjacent the periphery of the support member 32 and mirror element 30, the blind spot viewing system can be readily incorporated in conventionally sized exterior rearview mirror housings without requiring any significant additional size or space. Likewise, because the power source comprising motor 62 and gear assembly 64 is mounted on the pivot plate 40 and not on the support member 32 or mirror element 30, the weight of the power source is fully supported by the pivot plate and actuator 50 so that there is little or no vibrational affect from the weight of that assembly on the movable support member or reflective mirror element. Further, because threaded post 74 provides a rigid support for support member 32 and mirror element 30, the reflective mirror surface is less subject to vibration effects and/or blurring, both in its blind spot viewing position, and in the normal rearward viewing position.

Referring now to FIGS. 9–13, a second embodiment 10' of an exterior rearview mirror assembly incorporating a blind spot viewing system of the present invention is illustrated. Mirror assembly 10' is substantially similar to mirror assembly 10 except for the substitution of a different gear assembly 64' instead of gear assembly 64. Generally, mirror assembly 10' includes a mirror housing 12, bezel portion 14, forward wall 20, reflective mirror element 30, mirror holder or support member 32, pivot plate 40 and hinge members 38 and axle 44 all substantially as shown in mirror assembly 10. However, in mirror assembly 10', electric motor 62 drives a worm gear 70 which engages a telescoping gear assembly which is more compact than gear assembly 64, yet allows extension of the support member 32 and mirror element 30 to the same or even greater distance than gear drive assembly 64.

Gear drive assembly 64' includes an outer shell or housing 66' having a cylindrical base portion 66a', a first, integral, upstanding cylindrical subportion 66b' and a third cylindrical, integral subportion 66c' as well as an integral motor support tray 67' (FIG. 11), all of which are preferably molded in one piece from a resinous polymeric material such as a nylon, polyester, or ABS material. Housing 66' is adhered or otherwise secured to the interior side of pivot plate 40 such that cylindrical portions 66a', 66b' and 66c' are coaxial with aperture 48 and have their weight supported by pivot plate 40 just as in assembly 10. However, worm gear 70 engages a modified ring or drive gear 72' including an integral, axially extending housing 73' having parallel, diametrically opposed slots 75' on opposite sides thereof. A cylindrical collar 77' including radially extending, cylindrical ears 77a' and 77b' is telescoped within the hollow interior of housing portion 73' such that ears 77a', 77b' ride and slide within slots 75'. Threadably engaged on the threaded interior of collar 77' is extendable, threaded post 74' having a pivot head 76' adapted to be pivotally secured within socket 37 just as in mirror assembly 10. Accordingly, when motor 62 is secured within tray 67' such that worm gear 70 projects into the interior of cylindrical housing portion 66a', and ring/drive gear 72' is telescoped within the interior of housing 66' with collar 77' slidably telescoped within housing 73' and post 74' threadably engaging the interior of collar 77', rotation of worm gear 70 rotates drive gear 72' such that vertical slots 75' drive collar 77' for rotation therewith via ears 77a' and 77b'. Ears 77a' and 77b' also engage the threaded interior of housing portion 66b' (FIGS. 12A, 12B, 13A, 13B) such that as drive gear 72' rotates, ears 77a' and 77b' cause collar 77' to move axially within the housing 73' from the positions shown in FIGS. 12A and 13A, to the positions shown in FIGS. 12B and 13B. As collar 77' is rotated in the above manner, its rotation drives the threads on post 74' which moves upwardly as shown in FIGS. 12B and 13B since head 76' is secured to and prevented from rotating in socket 37 of mirror support 32. Accordingly, extension of threaded post 74 to the same or greater distance as post 74 in gear drive assembly 64 occurs with less overall height for housing 66' because of the inclusion of sliding collar 77'. The smaller height dimension for housing 66' requires less space within the mirror assembly thereby keeping the assembly size to a minimum and avoiding the need for additional space within housing 12.

As mentioned above, the hinge motion of mirror support 32 and mirror element 30 is preferably both outward and at a slight downward angle in order to provide proper viewing of the blind spot area. In order to achieve a view having a vertical dimension in the same location in the blind spot area as compared to the usual rear vision area visible in the exterior rearview mirror with a target vehicle at the same distance from the viewing driver in both areas, the reflective mirror element must pivot both outwardly and upwardly to a blind spot viewing position. However, in the blind spot, vehicles are actually closer to the car in which the viewing driver is riding, thereby requiring the vertical dimension of the view to be lowered. The amount by which the pivotal motion must extend downwardly depends on each specific vehicle. However, it has been found that by using a standard amount of downward rotation of approximately 5°, the blind spot viewing area will encompass most automobile, motorcycle or other vehicles in the blind spot viewing area $V_3$ as is shown in FIGS. 1A and 1B. Thus, in the preferred mirror assemblies of the present invention, the mirror element is pivoted outwardly 9° and downwardly 5° to reach the blind spot viewing position.

With reference to FIGS. 14–17, various alternate embodiments of power source 60 may be used in mirror assemblies 10 or 10' to provide operation of the blind spot viewing system. In embodiment 80 of FIGS. 14A and 14B, motor 62 may be fitted with a disk 81 fixedly secured to shaft 68. Disk 81 has a curved crank member 82 pivotally mounted near its periphery at 84. The outer end 86 of crank 82 is adapted to be secured to support member 32 at or adjacent socket 37. Hence, when motor 62 is actuated to rotate shaft 68 through 180°, crank 82 is extended, thereby pivoting support member 32 and mirror element 30 through the desired angle about hinge members 38 and axle 44. Likewise, reverse actuation of the motor 62 causes rotation of shaft 68 through 180° to retract crank 82 and return support member 32 to its normal rearward viewing position.

FIGS. 15A and 15B illustrate another alternative power source 90 including electric motor 62 and elongated cam member 91 fixedly secured to shaft 68. Upon actuation of motor 62, shaft 68 will rotate causing cam 91 to engage the interior surface of the support member causing outward pivotal movement. Reverse rotation of the motor returns the support member to its original position.

Figures 16A, 16B:
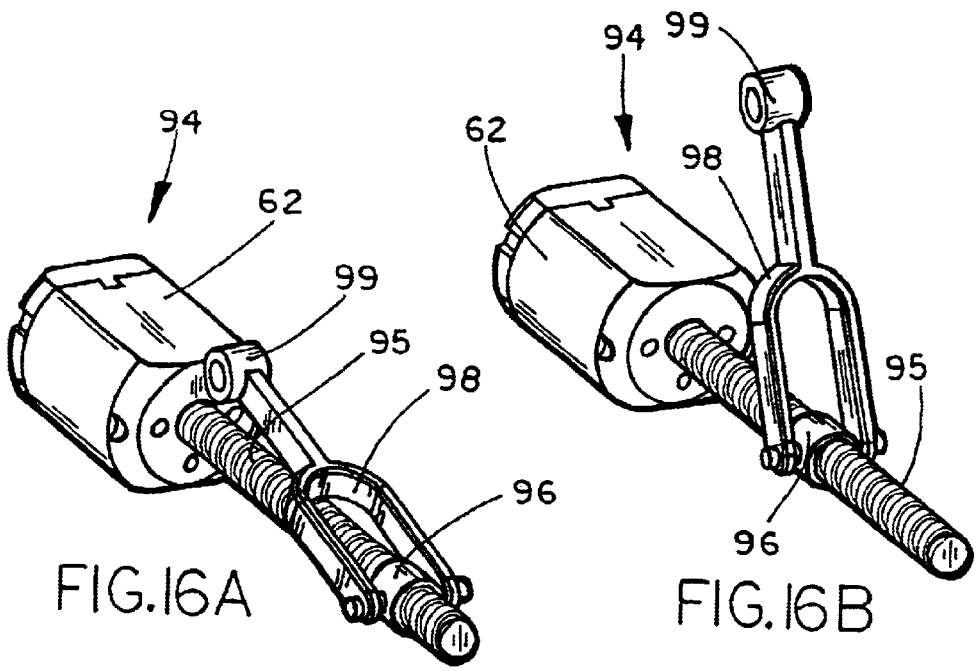
FIGS. 16A and 16B are perspective views of yet another electric motor and drive assembly for the blind spot viewing system of FIG. 2.

As shown in FIGS. 16A and 16B, yet another alternative power source 94 includes an electric motor 62 and an elongated worm gear 95 mounted on the shaft of the motor. A threaded collar 96 is engaged with worm gear 95 to which is pivotally secured an elongated crank or yoke 98 having a socket 99 pivotally secured to the underside of support member 32 such as at socket 37. Upon rotation of worm gear 95 in one direction, collar 96 is moved toward motor 62 thereby forcing pivot 99 upwardly on yoke 98 to move support member 32 outwardly. Rotation of worm gear 95 in the opposite direction moves collar 96 outwardly away from motor 62 and lowers pivot 99 and the, thus, support member 32.

Figures 17A, 17B:
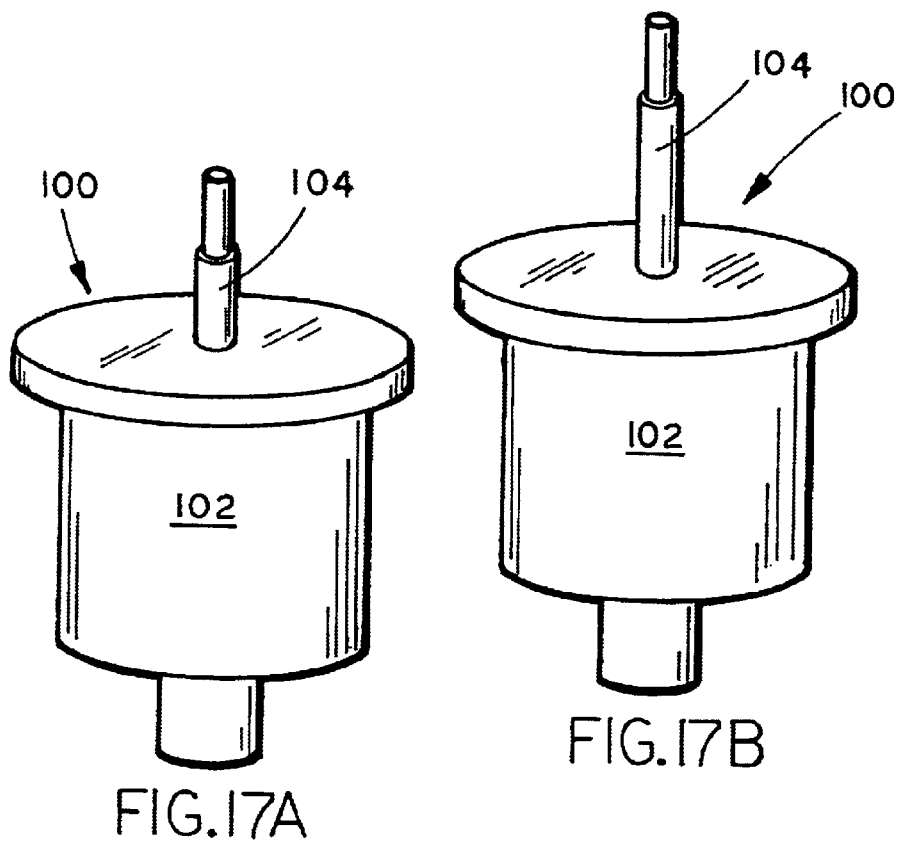
FIGS. 17A and 17B are perspective views of an electric solenoid drive useful in the blind spot viewing system of FIG. 2.

Yet another power source for actuation of the blind spot viewing system includes an electric solenoid 100 shown in FIGS. 17A and 17B. Solenoid 100 includes a flanged housing 102 adapted to be secured to the interior side of pivot plate 40 in the same position in which gear assembly 64 is mounted shown in FIGS. 5, 6 or 9. Solenoid 100 includes an extendible shaft 104 which is moved outwardly upon application of electric current to the solenoid. Hence, upon application of electric current, solenoid 100 is activated to extend shaft 104 to move support member 32 and mirror element 30 outwardly on hinge 38 and axle 44 in the manner described above. Deactivation of the solenoid retracts shaft 104 and returns the support member to its original position.

Figure 18:
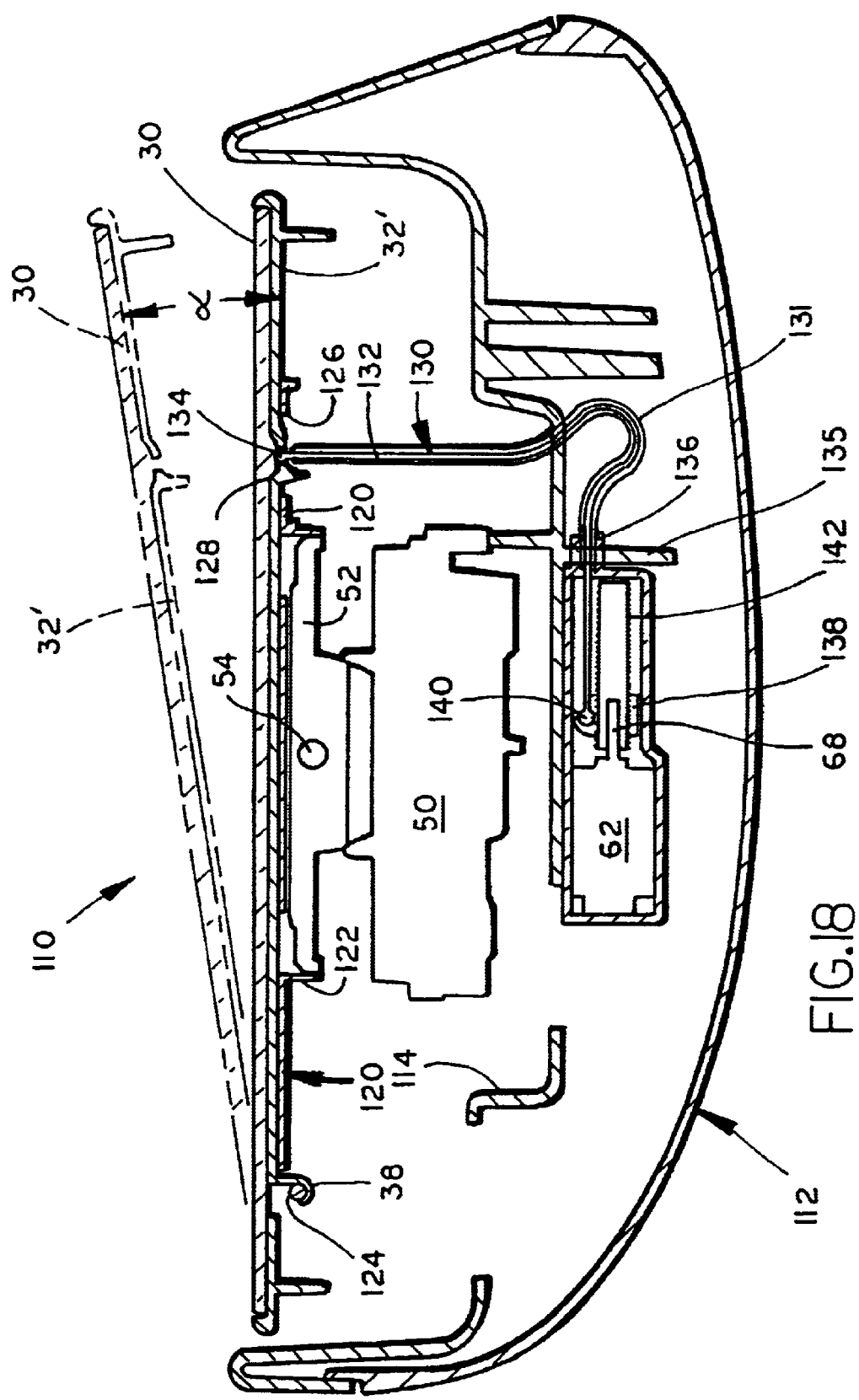
FIG. 18 is a sectional plan view of an alternate embodiment of the rearview mirror assembly incorporating a blind spot viewing system of the present invention using a cable drive assembly.
Figure 19:
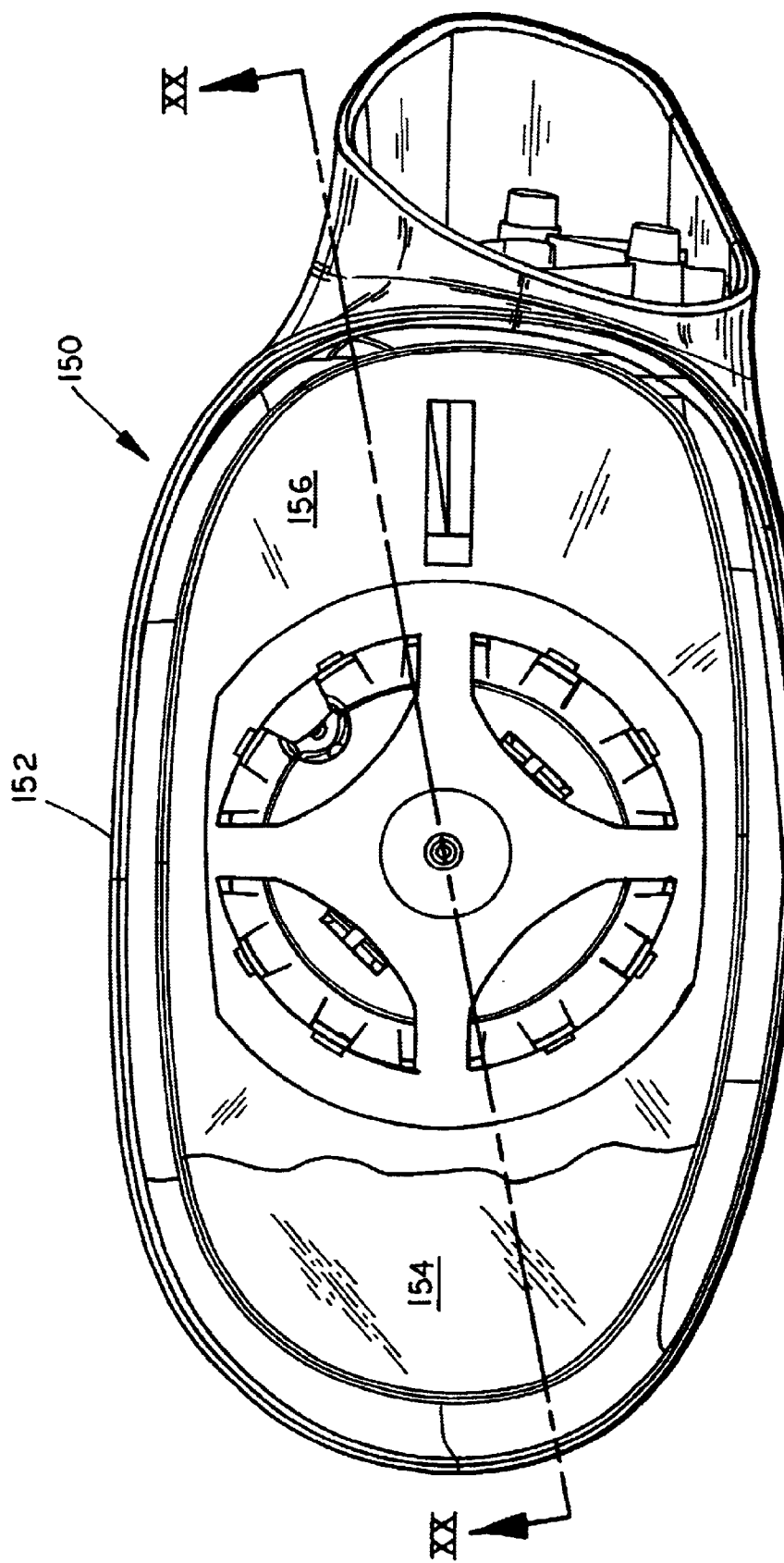
FIG. 19 is a rear elevation of yet another exterior rearview mirror assembly for vehicles incorporating an alternate embodiment of the blind spot viewing system of the present invention, the reflective mirror element being shown broken away to reveal the pivot member support and pivot axis.
Figure 20:
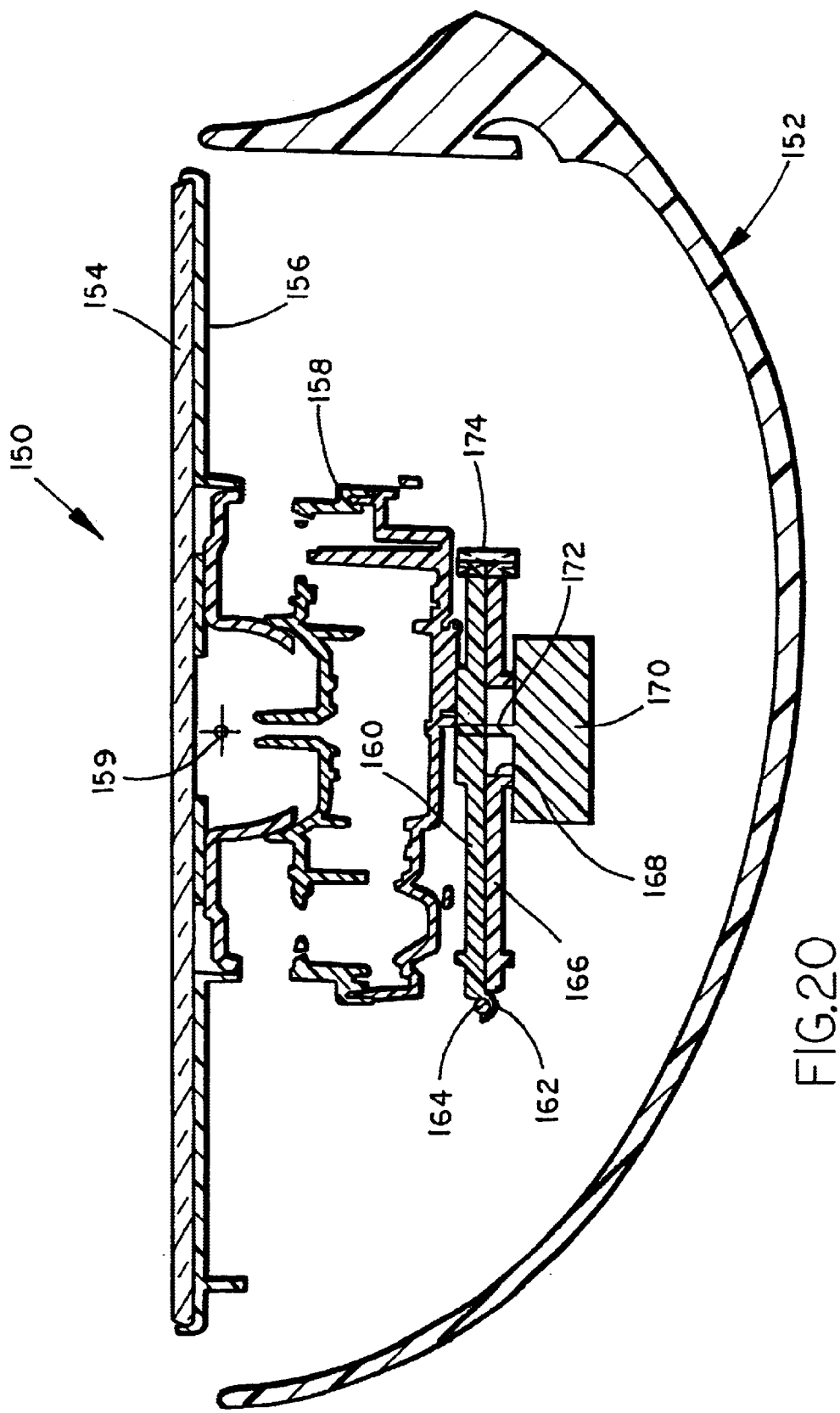
FIG. 20 is a sectional view of the rearview mirror assembly of FIG. 20 taken along plane XX—XX of FIG. 19.
Figure 21:
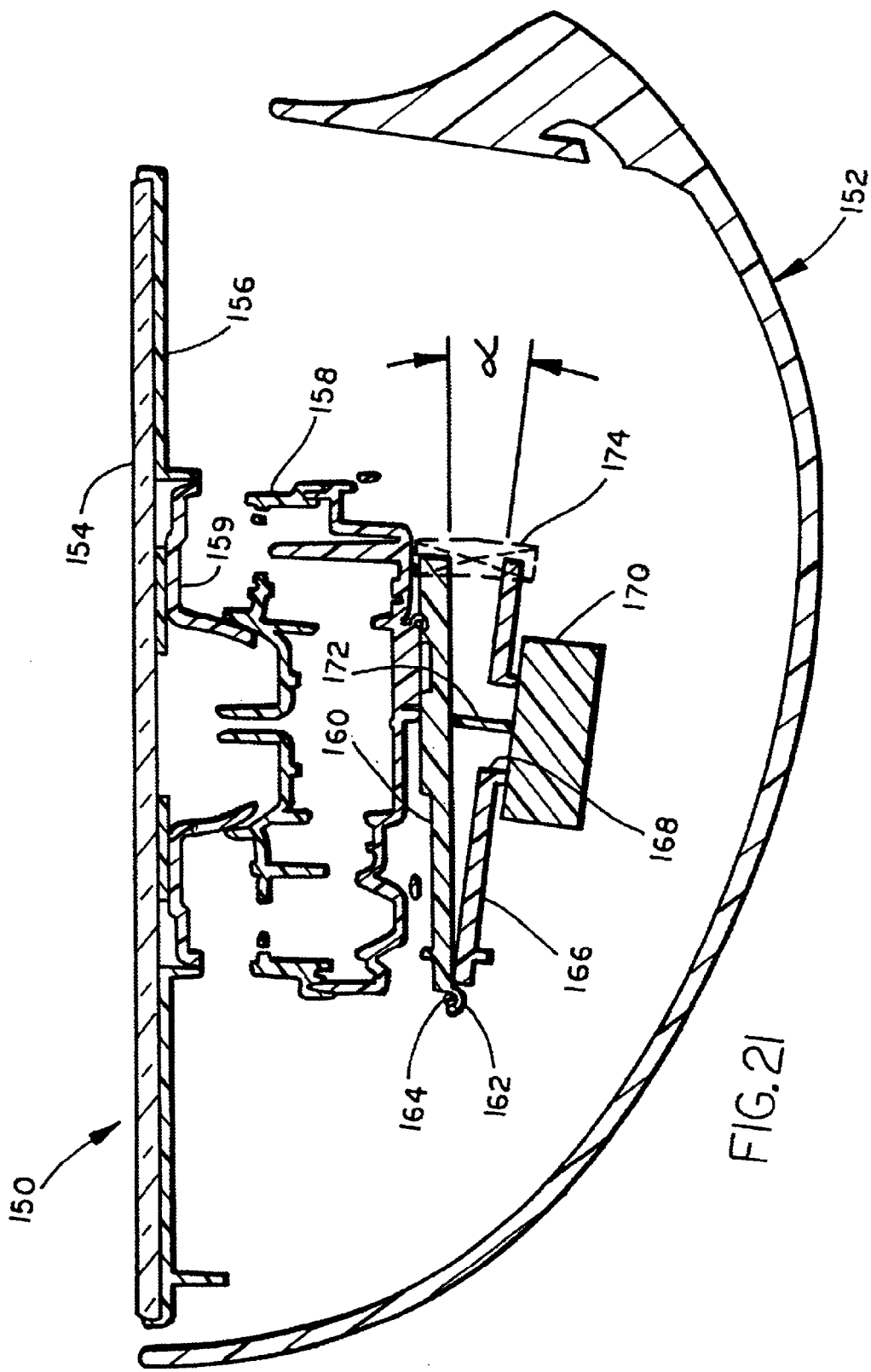
FIG. 21 is a sectional view of the rearview mirror assembly of FIG. 19 also taken along plane XX—XX but with the reflective mirror element shown pivoted to the blind spot viewing position.
Figure 22A:
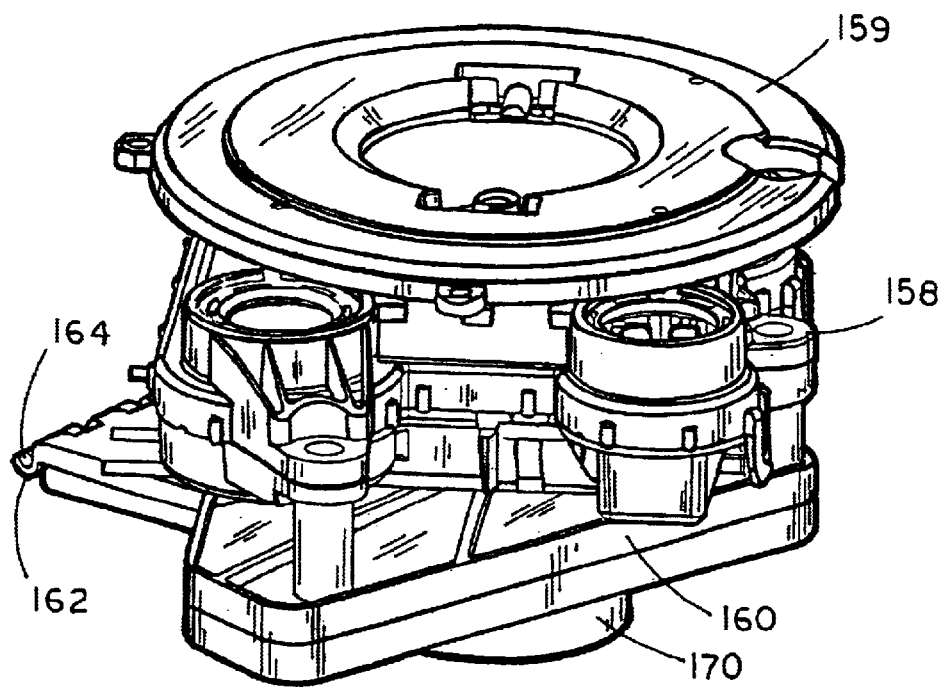
FIGS. 22A and 22B are perspective views of the support assembly for the reflective mirror element of FIGS. 19–21 in the normal rearward viewing position and in the blind spot viewing position, respectively.
Figure 22B:
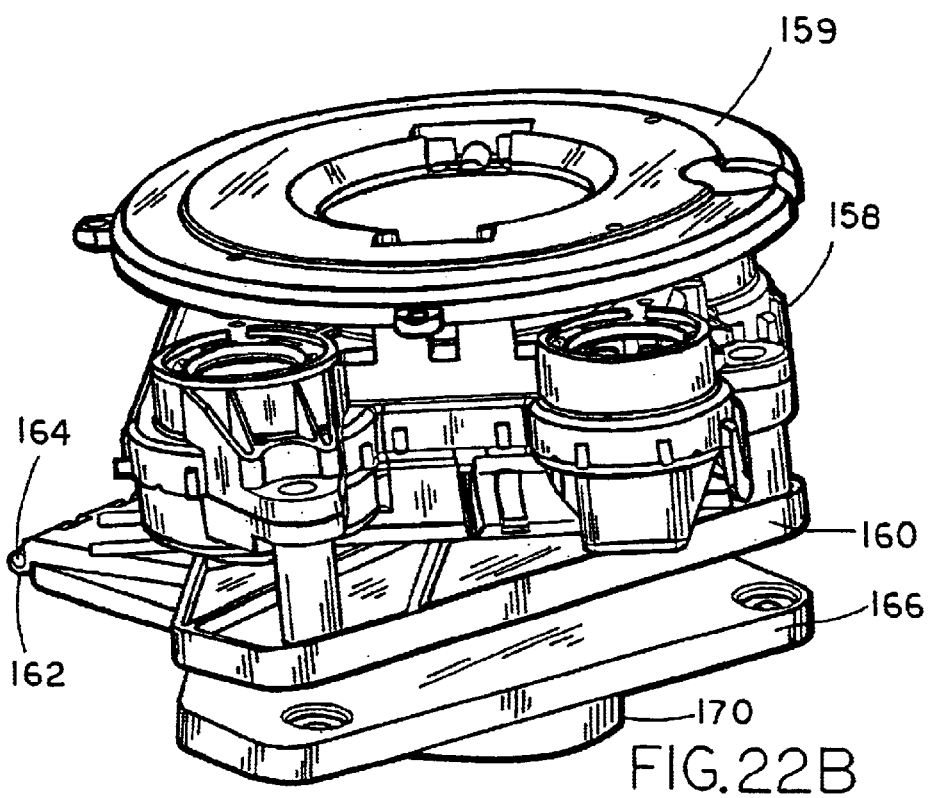

Referring now to FIG. 18, yet another embodiment 110 of an exterior rearview mirror assembly is shown including an alternate form of the blind spot viewing system. Mirror assembly 110 includes a molded polymeric exterior housing 112 similar to that in mirror embodiment 10 along with actuator 50 mounted on interior wall 114 of housing 112. Actuator 50 includes a pivot actuator 52 moveable about a pivot axis 54 which is centered on reflective mirror element 30 mounted in support member 32'. Instead of pivot plate 40 as in assembly 10, a modified pivot plate 120 is secured to the interior surface of a modified support member 32' and, in turn, to pivot actuator 52 via circumferential flange 122. Pivot member 120 also includes axle 124 which receives hinge members 38 in the manner described above for axle 44 in connection with mirror assembly 10. At the end of pivot member 120 opposite axle 124 is an aperture 126 spaced inwardly from the outer edge of the pivot member. A flexible, coaxial cable 130 is secured via enlarged cable end 134 in socket 128 on support member 32'. Cable end 134 is formed on the end of a flexible, non-extendible, non-compressible push-pull interior cable 132 which passes through aperture 126 and is secured to socket 128. The opposite end of the external sheath 131 of cable 130 is secured in a socket 136 on the exterior of a housing 135 mounted internally of mirror assembly 110 on the opposite side of wall 114 from actuator 50. Interior cable 132 extends through an aperture in socket 136 and is secured to a threaded collar 138 via cable head 140. Collar 138 is, in turn, threadedly mounted worm gear 142 fixedly secured to shaft 68 of electric motor 62 of the type described above in connection with mirror assembly 10. Accordingly, motor 62, collar 138 and gear 142 are positioned at a remote location from support member 32' and mirror element 30 but are connected via cable 130 to the support member for pivotal movement of the mirror element through angle ∀ to provide blind spot viewing when motor 62 is actuated by the vehicle driver through various switch apparatus on the interior of the vehicle. The arrangement of mirror assembly 110 avoids the positioning of motor 62 or gearing 138, 140 on pivot plate 120 and allows such elements to be fixedly secured in a rigid housing at a location within the mirror assembly thereby avoiding any vibration degradation with respect to mirror element 30. Cable 130 is sufficiently flexible to be routed through small internal spaces within the mirror housing for connection to the support member for movement of the mirror element without requiring significant additional space within the mirror housing. Additionally, cable 130 is sufficiently flexible to allow necessary pivoting of support member 32 and mirror element 30 through the desired angle ∀ (preferably 9°) regardless of the adjusted position of pivot member 120 on actuator 50 while a accommodating the slight lateral movement of socket 128 as it moves outwardly.

As shown in FIGS. 19–22, yet another embodiment 150 of an external rearview mirror assembly incorporating the blind spot viewing system of the present invention is illustrated. Mirror assembly 150 includes a rigid, molded mirror housing 152 having a rearward opening defining a cavity within the housing in which are mounted reflective mirror element 154 and support structure for adjusting the position of that element. More specifically, a reflective mirror element 154 similar to mirror element 30 above is mounted on molded, resinous polymeric pivot member 156 which, in turn, is pivotally secured to electric actuator 158 by pivot connector 159 for universal movement and adjustment of the position of the mirror element for different fields of view for different vehicle drivers. As in mirror embodiments 10 and 110, actuator 158 can be of the type available from Donnelly Corporation of Holland, Mich., under Model No. D 16 or MM 1. A pivot axis 159 for actuator 158 is preferably centered behind mirror element 154 as in mirror embodiments 10 and 110. In turn, actuator 158 is fixedly secured to molded, resinous polymeric support member or support plate 160. Support member 160 is, in turn, pivotally mounted to a molded, resinous polymeric mounting plate 166 by J-shaped hinge members 162 engaging axle 164 formed at the outer end of mounting plate 166. Mounting plate 166 is fixedly secured within mirror housing 152. An electric solenoid 170, such as solenoid 100 is mounted in alignment with aperture 168 in mounting plate 166 and includes an extendible shaft 172 similar to that for solenoid 100. Upon actuation, solenoid 170 causes extension of shaft 172 thereby pivoting support member 160, actuator 158, pivot member 156 and mirror element 154 in unison through a desired angle to provide blind spot viewing (FIG. 17). Upon deactivation of solenoid 170, shaft 172 is withdrawn and support member 160, actuator 158, pivot member 156 and mirror element 154 are returned to their normal rearward viewing positions. Preferably, a spring 174 is mounted over the ends of support plate 160 and mounting plate 166 at the end opposite hinge 162/axle 164 to urge the support member 160 back to its original position upon deactivation of solenoid 170.

A further embodiment 200 of an external rearview mirror assembly incorporating the blind spot viewing system of the present invention is illustrated in FIGS. 23–25. Mirror assembly 200 is similar to embodiment 150 but includes a modified power source for moving the assembly between the normal rear viewing position and the blind spot viewing position. More specifically, assembly 200 includes a rigid, molded mirror housing 152, reflective mirror element 154, molded resinous polymeric pivot member 156 and electric actuator 158, all of which are substantially similar to those in mirror assembly 150. As in assembly 150, actuator 158 is fixedly secured to molded, resinous polymeric support member or support plate 160 which, in turn, is pivotally mounted to a molded, resinous polymeric mounting plate 166 by J-shaped hinge members 162 engaging axle 164 formed at the outer end of mounting plate 166'. Mounting plate 166' is fixedly secured within the mirror housing. Instead of electric solenoid 170, assembly 200 includes an electric motor of the type shown at 62, and gear drive assembly 64' like that shown in mirror embodiment 10' described above in connection with FIGS. 9–13. Upon actuation, the electric motor drives a worm gear engaging drive gear 72' which, in turn, moves collar 73' and threaded post 74' outwardly as shown in FIG. 24 to pivot the entirety of support member 160, pivot plate 156 and reflective mirror element 154 as well as actuator 158 in unison through angle ∀, which is preferably 9°, to position mirror element 154 in the blind spot viewing position. Upon activation of the electric motor in the opposite direction, threaded post 74' of gear drive 66' retracts thereby pivoting support member 160, actuator 158, pivot member 156 and mirror element 154 in unison through the desired angle back to the normal rear viewing position. As in embodiment 150, a spring 174 similar to that used in assembly 150 may be mounted over the ends of support plate 160 and mounting plate 166' at the end opposite hinge 162/axle 164 to urge the support member 160 back to its original position upon activation of the electric motor and return of the threaded post 74' to its original position. Threaded post 74' may be pivotally connected to a socket 37' or other structure on the underside of support plate 160 in the manner described above for mirror assemblies 10 and 10'.

Preferably, when an electric motor, such as that described above at 62, is used to activate the movement of the blind spot viewing system of the present invention, an electrical control circuit 220 (FIG. 7) is connected to the electric motor for operation of the blind spot viewing system. Preferably, the circuit is formed on a printed circuit board 222 mounted within the housing of the mirror assembly and is connected to a switch 224 adapted to be activated by a driver within the cabin or passenger compartment of the vehicle on which the exterior mirror assembly including the blind spot viewing system is mounted. When switch 224 is activated, the electric motor is actuated and pivotal movement of the support member and mirror element is initiated in the manner described above. When the driver releases the switch, the motor or solenoid is reversed or released to return the mirror element to its normal rearward viewing position. Preferably, when the power source is an electric motor such as motor 62, circuit includes a current limiting device 226 which limits application of electric current to the electric motor when the motor is actuated to move the mirror element to its blind spot viewing position. In one form, current limiting device 226 reduces the electrical current applied to the electric motor when in the blind spot viewing position. In this form, the current applied to the motor in that position is at a reduced level but adequate to hold the motor in its extended position but of sufficiently low level to avoid damage to the motor. In an alternate form, current limiting device 226' completely shuts off electric current to the motor leaving the mirror element in that position until the electric motor is activated in the reverse direction.

In addition, alternate switching devices can be utilized. For example, a push/push switch can be connected to the circuit in which the driver pushes a button or other activating member to activate the electric motor and move the mirror element to its blind spot viewing position. Thereafter, the driver pushes the same button or activating member to return the motor and mirror element to its normal rearward viewing position. Alternately, an on/off type switch can be used in which the driver pushes the switch one way to activate the motor and another way to deactivate the motor and return the mirror element to its normal viewing position. Yet another method of switching can be used in which the driver activates the switch and physically holds the switch until deactivation of the blind spot viewing position is desired.

Further, a sensing device or sensor 228, such as a Hall sensor, can be included in the electrical control circuit which includes the above described current limiting device when the motor or other power source is extended sufficiently for the mirror element to reach the blind spot viewing position. The device includes the current limiting device described above as the motor or power source reaches the extended position and detects when the driver releases the switch and causes the device to return to the normal rearward viewing position at which point electric current is shut off from the motor once again. Preferably, the current limiting device described above is a relay which reduces power applied to the electric motor.

In addition, in any of the mirror assemblies 10, 10', 110, 150 or 200, instead of including a separate motive power source for the blind spot viewing system such as electric motor 62 and any of the above described drive systems, or a solenoid such as that shown at 100 or 170, the rearview mirror assembly incorporating the blind spot viewing system could incorporate a stepper motor, as is conventionally known. Such stepper motor could be incorporated in any of the actuators such as those shown at 50 or 158 mentioned above, thereby eliminating the need for a separate power source for actuation of the assembly to the blind spot viewing system. In such a system, the stepper motor, which is operated by electrical pulses and controlled by a circuit board mounted either in the mirror assembly or elsewhere in the vehicle, could be programmed to change its speed from a normal rearview mirror position adjustment speed of approximately 2 degrees to about 4 degrees per second, preferably about 3 degrees per second, to a much faster speed of greater than about 5 degrees per second, more preferably greater than about 10 degrees per second, and most preferably greater than about 15 degrees per second. A preferred range of speed is from about 15 degrees per second to about 25 degrees per second, more preferably about 17 degrees per second to about 20 degrees per second, so that the reflective mirror element could be moved by the actuator 50 or 158 itself rapidly to the blind spot viewing position and then returned to the normal rearward viewing position without the need for an additional power source. This would further improve vibration performance of the mirror assembly including such a stepper motor by eliminating the extra weight of any additional power source within the mirror assembly. In such case, the additional pivot such as that provided by hinges 38 described above would not be necessary, since the actuator could be programmed for operation by the stepper motor on its normal pivot to rapidly move the reflective mirror element both outwardly and downwardly as is preferred for proper blind spot viewing.

The blind spot viewing system of the present invention could be actuated by various devices including, but not limited to, an ultrasonic or other sensor which can sense the presence of a vehicle or object in the blind spot area such as area $V_3$ of FIGS. 1A and 1B, a camera adapted to view an area such as area $V_3$ adjacent the vehicle on which the blind spot viewing system is mounted, or a manual actuator such as those described above or others.

In addition, the exterior rearview mirror blind spot viewing system of the present invention could also include other features such as ground illumination lighting as described in U.S. Pat. No. 5,497,306, No. 5,669,699, No. 5,823,654, No. 6,176,602, and No. 6,276,821, an electronic control module, an antenna, a transmitter, a receiver, or a sensor as described in U.S. Pat. No. 6,019,475, the disclosures of all of which are hereby incorporated by reference herein.

Further, mirror element 30 may also be an electro-optic mirror element, such as an electrochromic or electrochemichromic rearview mirror element, as disclosed in U.S. Pat. No. 5,151,816, No. 5,142,407, No. 5,140,455, and No. 5,910,854, or a solid state electrochromic rearview mirror element as described in U.S. Pat. No. 4,712,879 and No. 5,668,663, the disclosures of all of which are hereby incorporated by reference herein.

While several forms of the invention have been shown and described, other forms will now be apparent to those skilled in the art. Therefore, it will be understood that the embodiments shown in the drawings and described above are merely for illustrative purposes, and are intended to limit the scope of the invention which is defined by the claims which follows.

The embodiments of the invention in which an exclusive property or privilege is claimed are defined as follows:

I claim:

1. An exterior rearview mirror blind spot viewing system for vehicles comprising:
   an exterior rearview mirror assembly including:
      a reflective mirror element having a center and a peripheral edge;
      a pivot member for pivotally mounting said reflective mirror element on said assembly to adjust the position of said mirror element for different fields of view for different vehicle drivers, said pivot member pivotally mounting said mirror element on an axis generally aligned with said mirror element center;
      a support member having a joint for pivotally mounting said reflective mirror element between a first rearward viewing position and a blind spot viewing position, said joint being spaced laterally outwardly of said center axis; and
      a motive power source for moving said support member and said reflective mirror element on said joint between said first rearward viewing position and said blind spot viewing position; said motive power source including an electric motor, a gear and a threaded member driven for extension and retraction by said electric motor and gear;
   whereby said blind spot viewing position provides an enhanced field of view for the vehicle driver in an area adjacent the vehicle on which said assembly is mounted.

2. The exterior rearview mirror blind spot viewing system for vehicles of claim 1 wherein said pivot member includes an actuator for adjusting said mirror element position, said support member being movably mounted on said pivot member by said joint, said joint positioned adjacent said peripheral edge of said mirror element.

3. The exterior rearview mirror blind spot viewing system for vehicles of claim 2 including a housing; said support member including a backing member secured to said mirror element; said actuator being fixedly mounted to said housing, said pivot member including a pivot plate pivotally secured to said actuator on said axis, said joint extending between said pivot plate and said backing member.

4. The exterior rearview mirror blind spot viewing system for vehicles of claim 3 wherein said actuator is an electric actuator adapted for control from a remote location.

5. The exterior rearview mirror blind spot viewing system for vehicles of claim 2 wherein said motive power source is mounted on said pivot member and engages and moves said support member and reflective mirror element when said electric motor is actuated.

6. The exterior rearview mirror blind spot viewing system for vehicles of claim 5 wherein said threaded member is pivotally attached to said support member.

7. The exterior rearview mirror blind spot viewing system for vehicles of claim 6 wherein said threaded member is a threaded post telescopingly mounted within said gear.

8. The exterior rearview mirror blind spot viewing system for vehicles of claim 7 wherein said threaded post includes an axis extending along its length, said threaded post being mounted for both axial and lateral movement with respect to said gear.

9. The exterior rearview mirror blind spot viewing system for vehicles of claim 1 wherein said threaded member is a threaded post which is pivotally joined to said support member.

10. The exterior rearview mirror blind spot viewing system for vehicles of claim 1 wherein said motive power source further includes a crank member pivotally secured between said threaded member and said support member.

11. The exterior rearview mirror blind spot viewing system for vehicles of claim 1 wherein said threaded member is mounted for movement laterally while being driven for extension and retraction.

12. The exterior rearview mirror blind spot viewing system for vehicles of claim 1 wherein said threaded member is connected to a push/pull cable connected to said support member.

13. The exterior rearview mirror blind spot viewing system for vehicles of claim 1 including a housing and a mounting plate within said housing; said pivot member including an actuator for adjusting said mirror element position; said actuator fixedly mounted on said support member; said joint extending between said support member and said mounting plate whereby said motive power source moves said support member, said pivot member including said actuator and said reflective mirror element in unison.

14. The exterior rearview mirror blind spot viewing system for vehicles of claim 13 wherein said motive power source is mounted on said mounting plate and engages and moves said support member when said electric motor is actuated.

15. The exterior rearview mirror blind spot viewing system for vehicles of claim 13 wherein said electric motor, said gear, and said threaded member are mounted on said mounting plate, said threaded member pivotally secured to said support member.

16. The exterior rearview mirror blind spot viewing system for vehicles of claim 15 further including an electrical control circuit for operating said motive power source, said circuit comprising a switch for controlling application of electric current to said electric motor, and an electric current limiting device for limiting application of electric current to said electric motor when said support member and reflective mirror element are in said blind spot viewing position.

17. The exterior rearview mirror blind spot viewing system for vehicles of claim 16 wherein said current limiting device reduces the electrical current applied to said electric motor when in said blind spot viewing position.

18. The exterior rearview mirror blind spot viewing system for vehicles of claim 17 wherein said current limiting device is a relay.

19. The exterior rearview mirror blind spot viewing system for vehicles of claim 16 wherein said current limiting device prevents electrical current from being applied to said electric motor when in said blind spot viewing position.

20. The exterior rearview mirror blind spot viewing system for vehicles of claim 16 wherein said electrical control circuit includes a sensor for detecting activation and deactivation of said switch.

21. The exterior rearview mirror blind spot viewing system for vehicles of claim 1 further including an electrical control circuit for operating said motive power source, said circuit comprising a switch for controlling application of electric current to said electric motor, and an electric current limiting device for limiting application of electric current to said electric motor when said support member and reflective mirror element are in said blind spot viewing position.

22. The exterior rearview mirror blind spot viewing system for vehicles of claim 21 wherein said current limiting device reduces the electrical current applied to said electric motor when in said blind spot viewing position.

23. The exterior rearview mirror blind spot viewing system for vehicles of claim 22 wherein said current limiting device is a relay.

24. The exterior rearview mirror blind spot viewing system for vehicles of claim 21 wherein said current limiting device prevents electrical current from being applied to said electric motor when in said blind spot viewing position.

25. The exterior rearview mirror blind spot viewing system for vehicles of claim 21 wherein said electrical control circuit includes a sensor for detecting activation and deactivation of said switch.

26. An exterior rearview mirror blind spot viewing system for vehicles comprising:
an exterior rearview mirror assembly including:
a reflective mirror element;
a pivot member for pivotally mounting said reflective mirror element on said assembly to adjust the position of said mirror element for different fields of view for different vehicle drivers, said pivot member pivotally mounting said mirror element on an axis at a predetermined position with respect to said reflective mirror element;
a support member having a joint for pivotally mounting said reflective mirror element between a first rearward viewing position and a blind spot viewing position, said joint being spaced from said axis; and
a motive power source for moving said support member and said reflective mirror element on said joint between said first rearward viewing position and said blind spot viewing position, said motive power source being mounted on said pivot member at a position spaced from said predetermined position of said axis, said motive power source including an electric motor, a gear and a threaded member driven for extension and retraction by said electric motor and gear; said threaded member pivotally secured to said pivot member;
whereby said blind spot viewing position provides an enhanced field of view for the vehicle driver in an area adjacent the vehicle on which said assembly is mounted.

27. The exterior rearview mirror blind spot viewing system for vehicles of claim 26 wherein said pivot member includes an actuator for adjusting said mirror element position, said support member being movably mounted on said pivot member by said joint, said joint positioned adjacent said peripheral edge of said mirror element.

28. The exterior rearview mirror blind spot viewing system for vehicles of claim 27 including a housing; said support member including a backing member secured to said mirror element; said actuator being fixedly mounted to said housing, said pivot member including a pivot plate pivotally secured to said actuator on said axis, said joint extending between said pivot plate and said backing member.

29. The exterior rearview mirror blind spot viewing system for vehicles of claim 28 wherein said actuator is an electric actuator adapted for control from a remote location.

30. The exterior rearview mirror blind spot viewing system for vehicles of claim 28 wherein said mirror element has a center; said axis being generally aligned with said mirror element center.

31. The exterior rearview mirror blind spot viewing system for vehicles of claim 26 wherein said motive power source engages and moves said support member and reflective mirror element when said electric motor is actuated.

32. The exterior rearview mirror blind spot viewing system for vehicles of claim 31 wherein said threaded member is a threaded post telescopingly mounted within said gear.

33. The exterior rearview mirror blind spot viewing system for vehicles of claim 32 wherein said threaded post includes an axis extending along its length, said threaded post being mounted for both axial and lateral movement with respect to said gear.

34. The exterior rearview mirror blind spot viewing system for vehicles of claim 26 wherein said threaded member is a threaded post which is pivotally joined to said backing member.

35. The exterior rearview mirror blind spot viewing system for vehicles of claim 26 wherein said motive power source further includes a crank member pivotally secured between said threaded member and said support member.

36. The exterior rearview mirror blind spot viewing system for vehicles of claim 26 wherein said threaded member is connected to a push/pull cable connected to said support member.

37. The exterior rearview mirror blind spot viewing system for vehicles of claim 26 including a housing and a mounting plate within said housing; said pivot member including an actuator for adjusting said mirror element position; said actuator fixedly mounted on said support member; said joint extending between said support member and said mounting plate whereby said motive power source moves said support member, said pivot member including said actuator and said reflective mirror element in unison.

38. The exterior rearview mirror blind spot viewing system for vehicles of claim 37 wherein said motive power source is mounted on said mounting plate and engages and moves said support member when said electric motor is actuated.

39. The exterior rearview mirror blind spot viewing system for vehicles of claim 37 wherein said electric motor, a gear, and a threaded member are mounted on said mounting plate, said threaded member pivotally secured to said support member.

40. The exterior rearview mirror blind spot viewing system for vehicles of claim 39 further including an electrical control circuit for operating said motive power source, said circuit comprising a switch for controlling application of electric current to said electric motor, and an electric current limiting device for limiting application of electric current to said electric motor when said support member and reflective mirror element are in said blind spot viewing position.

41. The exterior rearview mirror blind spot viewing system for vehicles of claim 40 wherein said current limiting device reduces the electrical current applied to said electric motor when in said blind spot viewing position.

42. The exterior rearview mirror blind spot viewing system for vehicles of claim 41 wherein said current limiting device is a relay.

43. The exterior rearview mirror blind spot viewing system for vehicles of claim 40 wherein said current limiting device prevents electrical current from being applied to said electric motor when in said blind spot viewing position.

44. The exterior rearview mirror blind spot viewing system for vehicles of claim 40 wherein said electrical control circuit includes a sensor for detecting activation and deactivation of said switch.

45. The exterior rearview mirror blind spot viewing system for vehicles of claim 26 further including an electrical control circuit for operating said motive power source, said circuit comprising a switch for controlling application of electric current to said electric motor, and an electric current limiting device for limiting application of electric current to said electric motor when said support member and reflective mirror element are in said blind spot viewing position.

46. The exterior rearview mirror blind spot viewing system for vehicles of claim 45 wherein said current limiting device reduces the electrical current applied to said electric motor when in said blind spot viewing position.

47. The exterior rearview mirror blind spot viewing system for vehicles of claim 46 wherein said current limiting device is a relay.

48. The exterior rearview mirror blind spot viewing system for vehicles of claim 45 wherein said current limiting device prevents electrical current from being applied to said electric motor when in said blind spot viewing position.

49. The exterior rearview mirror blind spot viewing system for vehicles of claim 45 wherein said electrical control circuit includes a sensor for detecting activation and deactivation of said switch.

* * * * *

UNITED STATES PATENT AND TRADEMARK OFFICE
CERTIFICATE OF CORRECTION

PATENT NO. : 6,672,731 B2 Page 1 of 1
APPLICATION NO. : 09/991463
DATED : January 6, 2004
INVENTOR(S) : Robert E. Schnell, David K. Willmore and Richard J. Weber It is certified that error appears in the above-identified patent and that said Letters Patent is hereby corrected as shown below:

Column 2:
Line 14, Insert --;-- after "Janowicz"

Signed and Sealed this

Nineteenth Day of December, 2006

JON W. DUDAS
*Director of the United States Patent and Trademark Office*